United States Patent
Kienzle et al.

(10) Patent No.: US 10,832,031 B2
(45) Date of Patent: Nov. 10, 2020

(54) COMMAND PROCESSING USING MULTIMODAL SIGNAL ANALYSIS

(71) Applicant: Apple Inc., Cupertino, CA (US)

(72) Inventors: Wolf Kienzle, Sunnyvale, CA (US); Douglas A. Bowman, Blacksburg, VA (US)

(73) Assignee: Apple Inc., Cupertino, CA (US)

( * ) Notice: Subject to any disclaimer, the term of this patent is extended or adjusted under 35 U.S.C. 154(b) by 187 days.

(21) Appl. No.: 15/676,921

(22) Filed: Aug. 14, 2017

(65) Prior Publication Data

US 2018/0046851 A1 Feb. 15, 2018

Related U.S. Application Data

(60) Provisional application No. 62/375,267, filed on Aug. 15, 2016.

(51) Int. Cl.
*G06K 9/00* (2006.01)
*G06F 3/16* (2006.01)
*B60K 35/00* (2006.01)
*G06F 3/01* (2006.01)
(Continued)

(52) U.S. Cl.
CPC .......... *G06K 9/00248* (2013.01); *B60K 35/00* (2013.01); *B60K 37/06* (2013.01); *G06F 3/013* (2013.01); *G06F 3/017* (2013.01); *G06F 3/0481* (2013.01); *G06F 3/167* (2013.01); *B60K 2370/146* (2019.05); *B60K 2370/148* (2019.05); *B60K 2370/1464* (2019.05); *B60K 2370/21* (2019.05); *G06F 2203/0381* (2013.01)

(58) Field of Classification Search
CPC .................. B60K 2370/146; B60K 2370/1464
See application file for complete search history.

(56) References Cited

U.S. PATENT DOCUMENTS

| 6,240,303 | B1 | 5/2001 | Katzur |
| 6,411,926 | B1 | 6/2002 | Chang |
| 6,804,396 | B2 | 10/2004 | Higaki et al. |

(Continued)

FOREIGN PATENT DOCUMENTS

| DE | 10045616 | 3/2002 |
| DE | 102012007984 | 3/2013 |

(Continued)

OTHER PUBLICATIONS

U.S. Appl. No. 15/709,389, filed Sep. 19, 2017, Scott M. Herz et al.

(Continued)

*Primary Examiner* — Asher D Kells
(74) *Attorney, Agent, or Firm* — Robert C. Kowert; Kowert, Hood, Munyon, Rankin & Goetzel, P.C.

(57) ABSTRACT

A first set of signals corresponding to a first signal modality (such as the direction of a gaze) during a time interval is collected from an individual. A second set of signals corresponding to a different signal modality (such as hand-pointing gestures made by the individual) is also collected. In response to a command, where the command does not identify a particular object to which the command is directed, the first and second set of signals is used to identify candidate objects of interest, and an operation associated with a selected object from the candidates is performed.

19 Claims, 12 Drawing Sheets

(51) Int. Cl.
  *B60K 37/06* (2006.01)
  *G06F 3/0481* (2013.01)

(56) References Cited

U.S. PATENT DOCUMENTS

| | | | |
|---|---|---|---|
| 7,000,200 | B1 | 2/2006 | Martins |
| 7,274,800 | B2 | 9/2007 | Nefian et al. |
| 7,394,346 | B2 | 7/2008 | Bodin |
| 7,672,845 | B2 | 3/2010 | Beranek et al. |
| 8,346,426 | B1 | 1/2013 | Szybalski et al. |
| 9,639,994 | B2 | 5/2017 | Beaurepaire |
| 9,950,711 | B2 | 4/2018 | Kleen et al. |
| 2013/0030811 | A1* | 1/2013 | Olleon .............. B60K 35/00 704/267 |
| 2013/0138591 | A1 | 5/2013 | Ricci |
| 2013/0241834 | A1 | 9/2013 | Vennelakanti et al. |
| 2013/0307771 | A1* | 11/2013 | Parker .............. G06F 3/013 345/158 |
| 2014/0223384 | A1 | 8/2014 | Graumann |
| 2014/0237366 | A1* | 8/2014 | Poulos .............. G06F 3/013 715/728 |
| 2014/0361973 | A1* | 12/2014 | Raux .............. G06F 3/167 345/156 |
| 2014/0365228 | A1* | 12/2014 | Ng-Thow-Hing ..... G02B 27/01 704/275 |
| 2015/0062168 | A1 | 3/2015 | Ng-Thow-Hing et al. |
| 2015/0100179 | A1 | 4/2015 | Alaniz et al. |
| 2016/0125736 | A1 | 5/2016 | Shaik |
| 2016/0132126 | A1* | 5/2016 | van Laack .......... G06F 3/0304 345/156 |
| 2016/0167648 | A1 | 6/2016 | James et al. |
| 2017/0039097 | A1* | 2/2017 | Klandt .............. G06F 9/546 |
| 2018/0052458 | A1 | 2/2018 | Tsuji et al. |
| 2018/0074497 | A1 | 3/2018 | Tsuji et al. |
| 2018/0345994 | A1 | 12/2018 | Goerick |

FOREIGN PATENT DOCUMENTS

| | | |
|---|---|---|
| EP | 3007036 A1 | 4/2016 |
| WO | 20150106867 | 7/2015 |
| WO | 2015198769 A1 | 12/2015 |

OTHER PUBLICATIONS

International Search Report and Written Opinion from PCT/US217/046924, dated Oct. 16, 2017, Apple Inc., pp. 1-15.
U.S. Appl. No. 15/826,486, filed Nov. 29, 2017, Scott M. Herz et al.
Andrew Wilson, et al., "XWand: UI for Intelligent Spaces," In Proceedings of the SIGCHI conference on Human factors in computing systems (pp. 545-552). ACM.
Linda E. Sibert, et al., "Evaluation of Eye Gaze Interaction," Proceedings of the SIGCHI conference on Human Factors in Computing Systems, pp. 281-288 Apr. 1, 2000, ACM.
David Droeschel, et al., "Learning to Interpret Pointing Gestures with a Time-of-Flight Camera," 2011 6th ACM/IEEE International Conference on Human-Robot Interaction (HRI), pp. 481-488.
Yang-Lei Zhao, et al., "Pointing at Responsive Objects Outdoors," In Proceedings of the 2012 ACM international conference on Intelligent User Interfaces (pp. 281-284). ACM.
Andy Lücking, et al. "Pointing andreferencereconsidered," ScienceDirect, Journal of Pragmatics 77 (2015) pp. 56-79.
Takehiko Ohno, et al, "Gaze-Based Interaction for Anyone, Anytime," In Proceedings of HCI International 2003 (vol. 4, pp. 1452-1456).
Richard A. Bolt, ""Put-That-There": Voice and Gesture at the Graphics Interface," 1980 ACM, (vol. 14, No. 3, pp. 262-270). ACM.
Boris Schauerte, et al. ""Look at this!" Learning to Guide Visual Saliency in Human-Robot Interaction," In Intelligent Robots and Systems (IROS 2014), 2014 IEEE/RSJ International Conference on (pp. 995-1002). IEEE.
Rümelin, S., Marouane, C., & Butz, A. (Oct. 2013). Free-hand pointing for identification and interaction with distant objects. In Proceedings of the 5th International Conference on Automotive User Interfaces and Interactive Vehicular Applications (pp. 40-47). ACM.
Nickel, K., & Stiefelhagen, R. (Nov. 2003). Pointing gesture recognition based on 3D-tracking of face, hands and head orientation. In Proceedings of the 5th international conference on Multimodal interfaces (pp. 140-146). ACM.
Udara E. Manawadu et al "A hand gesture based driver-vehicle interface to control lateral and longitudinal motions of an autonomous vehicle", 2016 IEEE International Conference on Systems, Man, and Cybernetics (SMC), dated Oct. 9, 2016, pp. 1785-1790.

* cited by examiner

COMMAND PROCESSING USING MULTIMODAL SIGNAL ANALYSIS

This application claims benefit of priority to U.S. Provisional Application No. 62/375,267, filed Aug. 15, 2016, titled "Command Processing Using Multimodal Signal Analysis" which is hereby incorporated by reference in its entirety.

BACKGROUND

Technical Field

This disclosure relates generally to systems designed to detect and respond to natural human movements and conversational queries, and more specifically to systems designed to identify and act upon entities of interest to an individual using potentially imprecise cues obtained from a combination of several types of signals such as gestures and gaze directions.

Description of the Related Art

Several systems, including some computer gaming systems, have implemented techniques to detect specific types of human gestures or movements. However, in many cases, the interpretation of the movements and speech in these systems is typically restricted to very specific domains (such as the particular game being played, or the movement of a particular input device required to be held in a hand) and locations (e.g., the individuals interacting with the system may have to be located within a particular camera angle range in a single room). Although some virtual reality systems may enable users to immerse themselves in selected environments, the extent to which naturalistic human behaviors can be used within such systems for general purposes is limited at best.

SUMMARY OF EMBODIMENTS

Various embodiments of methods and apparatus for using multimodal signal analysis to process commands and queries (e.g., expressed in natural language) by individuals are described. In at least some embodiments, a method may comprise obtaining a first set of signals corresponding to a first signal modality (e.g., the direction of the gaze of an individual) during at least a particular time interval. The method may also comprise obtaining a second set of signals corresponding to a different signal modality, such as hand pointing gestures or head movements such as nods. One or both of the data sets obtained may include timing information in some embodiments, e.g., the particular times at which various gestures were made or when the gaze direction remained steady for a certain amount of time may be indicated in the data sets. In response to a command, e.g., a spoken command from the individual, which does not explicitly, conclusively or definitively identify a targeted object to which the command is directed, the method may comprise utilizing the first and/or second data sets to identify one or more candidate objects of interest, and causing an operation associated with a selected object of the one or more candidates to be performed. In at least some embodiments, useful signal data corresponding to one or more of the modalities may be missing for at least some time periods, in which case the candidate objects may be identified using the data available. For example, in an embodiment in which gaze and gesture are the modalities of choice, if gaze signals are unavailable but gesture signals are available over some time period, the gesture signals may be used (and vice versa). If neither gaze nor gesture data is available for some time period associated with the command, but a video of the external environment of the individual is available, a best effort to identify candidate objects of interest from the video alone, without any directional specificity, may be made. In some embodiments the command may be expressed in a modality other than speech or voice: e.g., via sign language or using a touch-screen interface. Generally speaking, the techniques used in various embodiments may involve analyzing signals corresponding to any of a variety of signal modalities to respond to commands or queries, and are not restricted to specific modalities such as gesture, gaze or voice.

The term object, as used herein, may generally refer to inanimate things, animate entities (including, for example, animals, humans, or plants) and/or places, any of which may represent a target to which the command is directed. In some cases, the operation may simply comprise naming the selected object—e.g., if the command comprises the voiced query "What was that?", a response may comprise providing a name or identifier by producing a voiced response such as "That was a llama". In other cases, more complex operations may be performed—e.g., in response to a command "Park over there" issued by an individual in a car equipped to park itself, the method may comprise identifying a parking spot corresponding to the word "there" and initiating the parking of the car at the identified parking spot. In general, in various embodiments, targeted objects or places may be identified and acted upon based on analysis of natural movements and natural language, without requiring the individual to utilize a constrained set of interfaces. Imprecise language, such as demonstrative pronouns including "this" or "that" or adverbs of relative place such as "here" or "there" may be used in the commands in various embodiments, and one of the responsibilities of the computing devices processing the commands may include identifying, with some target level of accuracy and timeliness, the imprecisely indicated objects to which the commands are directed.

In some embodiments the method may comprise determining that the command refers to a past point in time, and utilizing buffered signal data (corresponding to a selected time window prior to the time at which the command is detected or processed) to respond to the command. The particular object identified as the target of such a command may no longer be visible (or being viewed by) the individual at the time that the operation is initiated in some cases. A wide variety of signal sources may be employed in various embodiments—e.g., cameras, microphones and the like which are positioned within a vehicle may be used, smart phone sensors may be used, virtual reality (VR) or augmented reality (AR) equipment such as headsets or glasses may be used, other wearable devices such as watches or fitness trackers may be used, and so on. For gesture signals, for example, in addition to video and/or still cameras, a variety of other sources may be used in different embodiments such as depth cameras, inertial sensors, electromagnetic signal detectors, ultrasonic signal detectors, radar signal detectors and the like. Similarly, for gaze detection, in addition to still or video cameras, non-camera-based optical sensors or EMG (electromyography) sensors may be used in some embodiments. In some cases, signals collected from several different types of sources or sensors may be examined collectively to process the commands—e.g., signals collected from cameras within a car may be combined/correlated with signals collected from a phone device held by the individual within the car. A variety of interfaces or communication techniques may be used to provide the responses to the commands in different embodiments, including for example touch screens, voice synthesizers and the like. Signal data collected from multiple sources may be processed in parallel in some embodiments to respond to a given command.

In one embodiment, a system may comprise one or more sensor devices and one or more command processing devices. The sensor devices may collect, for example, gaze and/or gesture data sets (or other types of data sets corresponding to respective signal modalities) pertaining to one or more individuals. At least one of the data sets may contain information indicative of a direction in which one or more objects that happened to attract the attention of an individual were (or are) positioned. In response to a command, the command processing devices may analyze the data sets collected by the sensor devices, identify one or more candidate objects or entities of interest to which the command may be directed, and cause at least one operation associated with a particular object or entity selected from among the candidates to be performed. In some embodiments, at least some of the command processing operations may be performed at some of the same devices at which the sensor data is collected. A wide variety of operations may be performed in different embodiments in response to the command, such as naming the selected object, taking a photograph or video of the object, translating a symbol or word pertaining to the selected object, parking or driving a vehicle, indicating the contents of a street or highway sign (which may also involve language translation in some cases), and so on. In various embodiments, the command processing devices may assign respective predicted interest scores or relevance scores to different candidate objects, e.g., using a set of rules or heuristics or a machine learning model, and select an object from among the candidate objects based at least in part on its score. In some cases, a particular object selected as the target object of the command may be identified incorrectly, and the individual who issued the command may provide feedback indicating that the selected object was not the one to which the command was directed. In such a scenario, in some embodiments an iterative approach may be employed, in which different objects (selected, e.g., based on their respective interest scores from the original candidate set, or from a new candidate set) may be acted upon in sequence until the command has been fulfilled (or until a decision to avoid further processing of the command is made by the processing devices, the command issuer or both). In some embodiments, the command processing may comprise obtaining still or video imagery from one or more cameras and applying selected object recognition algorithms to the images. External databases such as map databases (which may indicate the locations of various buildings, roads, geographical/geological features and the like), product databases (such as databases containing images of various vehicle models or animals), and/or other databases (such as contact lists or other personal profile information) may be utilized to process at least some commands in various embodiments. In at least one embodiment, a command may include a request for specific details regarding an object of interest (e.g., "What are the hours of that restaurant?"). To respond to such commands, in an Internet-based data source such as a search engine may be employed.

According to some embodiments, a non-transitory storage medium may comprise program instructions that when executed on one or more processors obtain and analyze data sets indicative of respective signal modalities from one or more individuals. The analysis may be used to identify candidate objects of interest, and an operation on a selected object of interest may be performed, e.g., in response to a command. In one embodiment, the selected object of interest may be a virtual object defined in a virtual reality (VR) or augmented reality (AR) environment. In various embodiments, the processing of a command may include temporal and/or spatial correlation-based analysis of data sets collected from different sources, e.g., including one or more sensor devices such as cameras which are attached to or incorporated within a vehicle.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Figure 1:
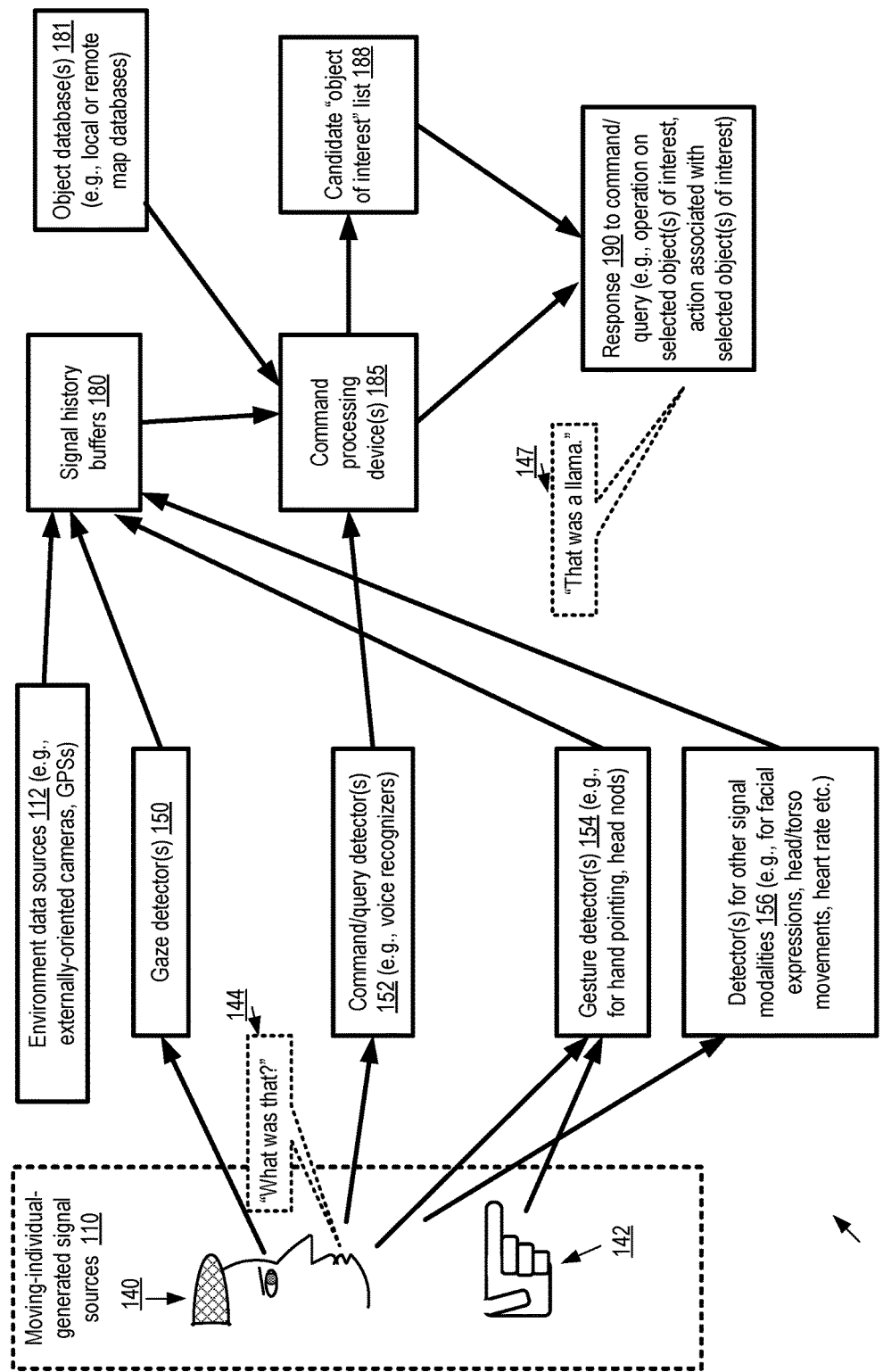
FIG. 1 illustrates an example system environment in which multiple types of signals obtained from an individual, including gesture data and gaze data, may be analyzed collectively to respond to potentially imprecise natural language queries or commands issued by the individual, according to at least some embodiments.

FIG. 1 illustrates an example system environment in which multiple types of signals obtained from an individual, including gesture data and gaze data, may be analyzed collectively to respond to potentially imprecise natural language queries or commands issued by the individual, according to at least some embodiments. As shown, system 100 may comprise several types of signal detectors for detecting human movements and other human behaviors, including one or more gaze detectors 150, one or more gesture detectors 154, and one or more voice command/query detectors 152. Individual ones of the signals detectors may comprise, for example, respective sensor devices (e.g., video and/or still cameras in the case of the gaze detectors and gesture detectors, microphones in the case of command/query detectors and the like). For gesture signals, a variety of additional sources may be used in different embodiments such as depth cameras, inertial sensors, electromagnetic signal detectors, ultrasonic signal detectors, radar signal detectors and the like may be employed. For gaze detection, in addition to still or video cameras, non-camera-based optical sensors or EMG (electromyography) sensors may be used in some embodiments. Both gaze and gesture may provide directional information regarding potential objects of interest: for example, the gaze of an individual at a point in time may be represented in some embodiments by a three dimensional vector extending from a point between the individual's eyes, indicating the direction in which the individual was looking (and thereby potentially helping to identify an object of interest). Command and/or queries may be detected using signals other than voice/speech in some embodiments—e.g., sign language may be used for a command, or a touch screen interface may be used to indicate at least a portion of a command. In various embodiments, a given signal detector may also include hardware and/or software capable of performing at least some initial level of analysis or filtering of the collected signals, buffering of the collected signals, assigning timestamps or other timing indicators to various groups of signals or individual signals, receiving configuration directives or commands associated with the collection, analysis or filtering of signals, as well as transmitting the raw and/or processed signals to one or more destinations.

The different types of signals (e.g., gestures versus gaze versus voice) may be referred to as respective signaling modes or signal modalities, and the analysis of combination of signals of different modalities from an individual to respond to the individual's requests or commands may be referred to as multimodal signal analysis; as such, systems similar to those shown in FIG. 1 may be referred to herein as multimodal signal analysis systems. One signal modality may be distinguished from another, for example, based on some combination of (a) the particular part of the body which is the source of the signals (e.g., eye versus hand versus vocal system) and/or (b) the techniques and media used to capture and analyze the signals (e.g., capturing physical movements via a video camera, followed by execution of movement analysis algorithms, versus capturing voice signals followed by execution of voice recognition and natural language processing algorithms). Although gaze, gesture and voice are the modalities used most frequently as examples in this document, the techniques described herein may be applied to signals corresponding to any desired modalities, and are not restricted to gaze, gesture or voice. As such, in system 100, in addition to detectors for gaze, gesture and speech/voice tokens, one or more detectors 156 for other modalities such as facial expressions (including smiles, frowns, etc.), head orientation or movement (including nods, head shakes etc.), torso orientation or movement, gestures made using body parts other than hands (such as shoulder shrugs), and/or involuntary physiological responses/behaviors such as changes to heart rate, breathing rate, skin conductance and the like may also or instead be used. As discussed below in the context of FIG. 10, in some embodiments it may be possible to determine an object targeted by a command 144, and initiate operations to fulfill the command, even in situations in which useful information may not be available (at least for some time periods) with respect to one or more of the different signal modalities for which the system is equipped to capture signals. One high level goal of systems similar to system 100 in various embodiments may include providing responses via automated analysis to at least some types of commands or queries expressed using natural or normal human interactions and behaviors, in a manner similar to the way human beings having a conversation would tend to interact with one another, without requiring the individuals to go to the extra trouble of using special-purpose command/query interfaces or restricted command/query languages.

In the depicted embodiment, the gaze detectors 150, gesture detectors 154 and command/query detectors 152 may capture signals generated by one or more individuals that may be in motion during some time intervals in which the signals are captured. For example, the individual whose head 140, eyes and hand 142 are captured by the gaze detectors 150 and gesture detectors 154 may happen to be sitting in a moving vehicle such as a car, a motorcycle, a boat or a bus while the observations are collected, or may happen to be walking, running or cycling. Of course, the signals may continue to be captured from the individual while the individual is at rest (e.g., if/when the car stops at a traffic light). As discussed below, the movement of the observed individual over time may make the problem of identifying the objects referred to by the individual somewhat more complex than if the individual were stationary; however, motion of the signal source(s) is not a requirement for a successful use of the multimodal signal analysis techniques discussed herein. At least some of the signal detectors may store timestamps or other timing information as well as the raw signals themselves—e.g., it may be possible using the collected signals to determine the time at which a particular gesture was made, and/or to arrange events such as a head or neck movement (a nod or shake of the head), a torso movement (such as a bend of the body towards or away from some object), a change of gaze direction, and a vocalized query in temporal order.

A number of different types of gestures may be detected in the depicted embodiment, including hand or finger pointing gestures, head nods or turns, body bends, eyebrow or forehead movements, and so on. In some embodiments separate devices or gesture detectors 154 may be used for respective types of gestures—e.g., one sensor may be used for capturing hand pointing gestures, another for one or more types of head movements such as nodding, tilting or circling the head, and so on. In other embodiments, a single camera may be used to capture several different body movements, and the data collected by that single camera may be processed to identify one or more types of gestures. The gaze detectors 150 may capture information regarding the directions in which the individual's eyes are pointing at various points in time in the depicted embodiment. In some embodiments, the gaze detectors may also capture specific types of eye movements such as smooth pursuit (in which the eye follows a moving visual target), voluntary saccades (in which the eye rapidly moves between fixation points), and/or vergence (in which the angle between the orientation of the two eyes is changed to maintain single binocular vision with respect to a particular set of objects).

The command/query detectors 152 may capture voiced communications emanating from the individual such as the depicted query "What was that?" 144 in the depicted embodiment. Command/query interfaces which are not voice-based may also or instead be used in some embodiments—e.g., a command may be issued via a touch-screen interface or the like. In much of the subsequent discussion, the term "command" may be considered to subsume the term "query" with respect to the interactions originating at the individual and directed to the components responsible for responding to the interaction. For example, a query such as "what was that?" may be considered the logical equivalent of a command to provide an answer to the question "what was that?". As discussed below, a command may, in at least some cases, involve an action other than an answer to a question—e.g., a command such as "park the car there" may result in a vehicle (occupied by the individual issuing the command) being parked at the location corresponding to "there". Also, in much of the subsequent discussion, the term "object" (e.g., used in the phrase "object of interest") may generally refer to inanimate things, animate entities (including, for example, animals, humans, or plants), places or combinations thereof. For example, as the phrase is used herein, one object of interest may comprise a person (a human) carrying a backpack (an inanimate object) while walking a dog (an animal), another object of interest may comprise a parking spot for a car, and so on.

In addition to the signals originating at the individual, a number of signals pertaining to the external environment of the individual may also be collected in various embodiments. Environmental data sources 112 may include, for example, one or more externally-oriented cameras (i.e., cameras which are not directed at the individual or not directed solely at the individual), global positioning system (GPS) devices, and the like. In some embodiments, at least some weather-related data sources (such as anemometers, thermometers, and the like) may also contribute to the data collected regarding the individual's external environment.

Data from the various signal detectors (those focused on the individual's movements/behaviors, such as the gaze, gesture and command detectors, as well as those focused on the external environment) may be buffered temporarily in at least some embodiments. The signal history buffers 180 may be configured, for example, to store signals corresponding to the previous N seconds at any given point in time, discarding or overwriting older data. In one embodiment a hierarchical set of signal data storage devices may be used, with signals corresponding to N seconds being stored at a first layer of devices, signals corresponding to a longer duration of P minutes being stored at a second layer, and so on. In some embodiments at least some level of the buffering may be implemented at the signal detectors themselves—that is, at least a portion of the signal history buffers 180 may be incorporated at the cameras or other devices where the signals are captured. In other embodiments at least some of the buffering may be implemented at a separate storage device or a remote data center—e.g., the signal detectors may transmit the collected data via any desired wireless and/or wired communication pathways to a remote data center for storage/buffering.

In the depicted embodiment, one or more command processing devices (CPDs) 185 may be responsible for analyzing the collected signals from the various sources to generate responses to the command/queries issued by the individual. Command processing devices 185 may also be referred to herein as command processors. The command may be parsed or interpreted at the CPDs 185, e.g., using natural language processing (NLP) algorithms, to determine what other data needs to be analyzed to prepare the response. The command processing devices 185 may comprise a plurality of distributed hardware and/or software components in some embodiments—e.g., in embodiments in which the individual is in a vehicle, some of the components may run within the vehicle while others may run at a back-end data center. Depending on the nature of the specific command or query, at least some of the results of the processing may be transmitted back to local commands (such as local user interfaces) from the remote components, e.g., via wireless communications, so that the results can be provided to the individuals who issued the command.

Based at least in part on an analysis of a combination of data provided by various signal detectors (including for example the gesture detectors 154, the gaze detectors 150 and/or the external environment data sources 112), the command processing devices 185 may generate a list 188 of candidate objects of interest which may be being referred to in the command 144. In at least one embodiment, the processing or analysis of signal data corresponding to different modalities may be performed in parallel, potentially using respective sets of computing devices—e.g., gaze signals may be processed concurrently with gesture signals and/or voice/speech signals. In some implementations, gaze changes and/or gestures may be represented as discrete events in a processed version of the raw signals (e.g., a version produced either at the sensor devices themselves, or at the command processing devices). For example, in an embodiment in which hand gesture data indicates the direction (within an angular range of 0 to 360 degrees with respect to a horizontal plane, and within an angular range of −90 degrees to +90 degrees with respect to vertical orientation), a timestamped discretized version of a gesture data set may comprise something like the following: [2016-04-05-09:00:00 GMT to 2016-04-05-09:00:03 GMT: right index finger of individual A pointed at horizontal angle 37.5 degrees, vertical angle 15.2 degrees], [2016-04-05-09:00:03 GMT to 2016-04-05-09:00:10 GMT: no gesture from individual A], [2016-04-05-09:00:10 GMT to 2016-04-05-09:00:12 GMT: left hand of individual A pointed at horizontal angle 122 degrees, vertical angle 25 degrees], . . . , etc.

In various embodiments, the commands/queries may generally be expressed in natural conversational language, e.g., using demonstrative pronouns such as "this" or "that", relative adverbs such as "here" or "there" and the like. As a result, the target object of interest (i.e., the object to which the pronoun "that" is intended to refer in the "what was that") may not be immediately apparent, leading the command processing devices to use gesture and gaze data (if such data is available) to narrow down the set of potential objects to arrive at list 188 as discussed below in further detail. In addition to the sensor data collected by the signal detectors, in at least one embodiment the command processing devices may also utilize one or more external databases, such as object database(s) 181, to prepare the candidate list 188. The object databases 181 may contain, for example, geographical map data indicating the names and locations (e.g., in latitude and longitude units) of buildings, parking lots, geographical/geological features and the like, catalogs indicating the names of vehicles or products, and so on. Data sources accessible via the public Internet (e.g., encyclopedia sites, public records sites, government publication sites, dictionaries or the like) may be used to help prepare the response to certain types of commands in some embodiments. In various embodiments, from among the candidate list of objects of interest, a particular object may be selected by the command processing devices 185 as the one most likely to be the one being referred to in the command. In some embodiments, respective interest scores or relevance scores may be assigned to at least some of the list members, e.g., based on correlations with detected gestures/gazes, based on the conversational context, based on expected novelty or distinctiveness of the member objects, and so on. The scores may be used to select a particular object as the likely target of the command issued by the individual. In some embodiments as described below in further detail, the command processor(s) may generate a disambiguation request, in effect asking the individual to select the intended target object from a set of candidates.

Depending on what the command or query consisted of, the command processing devices 185 may generate the appropriate response 190 in the depicted embodiment. An operation or action associated with the selected object of interest may be taken in response to some commands (e.g., a photograph or video of the selected object may be taken), and/or a visual or vocalized response may be provided. In various embodiments, the command processing devices may cause one or more other devices (e.g., cameras, the driving mechanisms of a car, etc.) or entities to perform the operation (or operations) to given command or query, e.g., by invoking an application programming interface. In the depicted embodiment, the vocalized response "That was a llama" 147 may be provided to the query "what was that?" 144 (presumably because an animal that was identified by the command processing devices as a llama had been visible to, or been gestured at, by the individual in a recent time interval). A voice synthesizer may be used for the response in some embodiments, and/or a visual display or screen may be used. If the response is not satisfactory, in at least some embodiments further rounds of interactions may occur between the individual and the components of the system. For example, the individual may say something like "No, I didn't mean the animal, I meant the building" or simply "No, I didn't mean the llama". In such a scenario, the command processor(s) may attempt to find another candidate object of interest which meets the narrowed criterion indicated by the individual (e.g., either using the original list of candidates, or by generating a new list) and may cause a second operation to correct/replace the original response to the query 144. Several such iterations may be performed in various embodiments, e.g., until a satisfactory response (from the perspective of the command issuer) is provided or until further interactions are terminated/aborted by one of the parties (the individual or the command processors).

Figure 2:
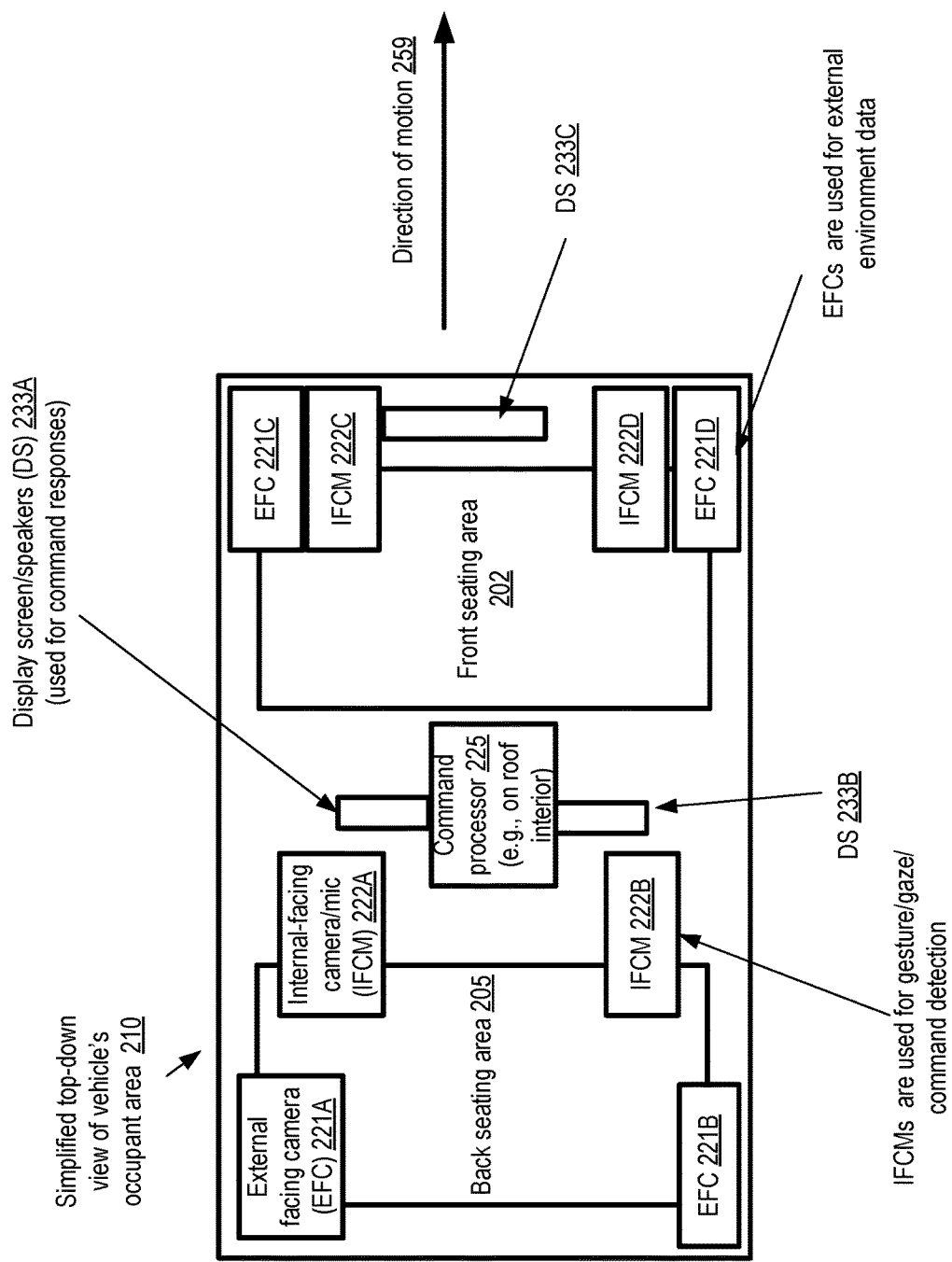
FIG. 2 illustrates an example vehicle environment comprising a plurality of sensors which may collect data that can be analyzed to respond to spoken requests from the vehicle's occupants, according to at least some embodiments.

FIG. 2 illustrates an example vehicle environment comprising a plurality of sensors which may collect data that can be analyzed to respond to spoken requests from the vehicle's occupants, according to at least some embodiments. A simplified top-down view 210 of the vehicle's occupant area is provided. The vehicle may, for example, comprise a car, truck, golf-cart, all-terrain vehicle, or the like. In at least some embodiments, at least some of the movements of the vehicle may not require direct human control—e.g., the vehicle may be able to park itself automatically, drive under some conditions without being guided by a human, and so on. Objects which may be located at different depths with respect to each other (and may thus be obscured by each other or by other objects) in the vehicle are shown, even though at least some of the objects may not actually be visible simultaneously in a more realistic depiction. As indicated by arrow 259, the vehicle may be moving from left to right in FIG. 2. The vehicle may include two rows of seating areas in the depicted embodiment: front seating area 202 and back seating area 205. For example, in one scenario two occupants may sit in each of the seating areas.

The signal detection components of the vehicle may be designed to capture gesture, gaze and voice signals from the occupants, and environmental signals from the exterior of the vehicle. Respective sets of internal-facing cameras and microphones (IFCMs) 222, such as IFCN 222A-222D, may be configured to capture movements from the occupants. Although four IFCMs are shown, so that respective IFCMs may be used for capturing signals from respective occupants in a four-occupant scenario, the relationship between IFCMs and occupants need not be one-to-one in various embodiments. For example, a single camera and/or a single microphone may be used to collect signals from multiple occupants in some embodiments, and conversely, multiple cameras and/or microphones may be used to capture a single occupant's signals in some conditions. In some cases, the mapping between the IFCMs 222 and the occupants may change with occupancy—e.g., if there are only two occupants during some time period, two IFCMs may be directed towards each of the occupants; later, if two more occupants occupy the vehicle, one IFCM may be directed towards each occupant.

Four external facing cameras (EFCs) 221A-221D may capture the scenes viewable from various parts of the moving vehicle in the depicted embodiment. As with the IFCMs, the relationship between EFCs and occupants need not necessarily be 1:1 in at least some embodiments. If the data collected by EFCs located relatively far away from an occupant are used to respond to the commands issued by the occupant, the accuracy of the identification of objects of interest may be lower in some embodiments than if data collected by EFCs positioned fairly close to the occupant are used. A local command processor component 225 may be located in the vehicle of FIG. 2, e.g., attached to the interior roof or below the seats. In some embodiments, the local command processor component 225 may perform at least some of the analysis of the signals collected by the IFCMs and the EFCs to help identify candidate objects of interest and/or select particular objects of interest to prepare responses to occupants' commands. In other embodiments, the local command processor component 225 may offload some or all of the signal analysis and interpretation workload to one or more servers at a data center—e.g., the local component may transmit representations of the signals to the servers, receive the results of analyses performed at the servers, and so on. Display screens and speakers (DSs) 233A-233C may be used to provide indications of the responses to at least some types of queries and commands issued by the occupants. For example, if a query such as "What was that?" (query 144 of FIG. 1) is issued by an occupant of the rear seating area, a voiced response "That was a llama" may be provided via DS 233A or 233B, and/or a picture/video of a llama may be displayed using DS 233A or 233B in the depicted scenario. In at least some embodiments, signals collected from several different individuals may be used to respond to a particular query or command—e.g., gestures or gaze changes of two or more occupants of a vehicle, when analyzed in combination, may provide a clearer indication of an object targeted by a given command than if signals of only a single individual were examined in isolation.

Figure 3:
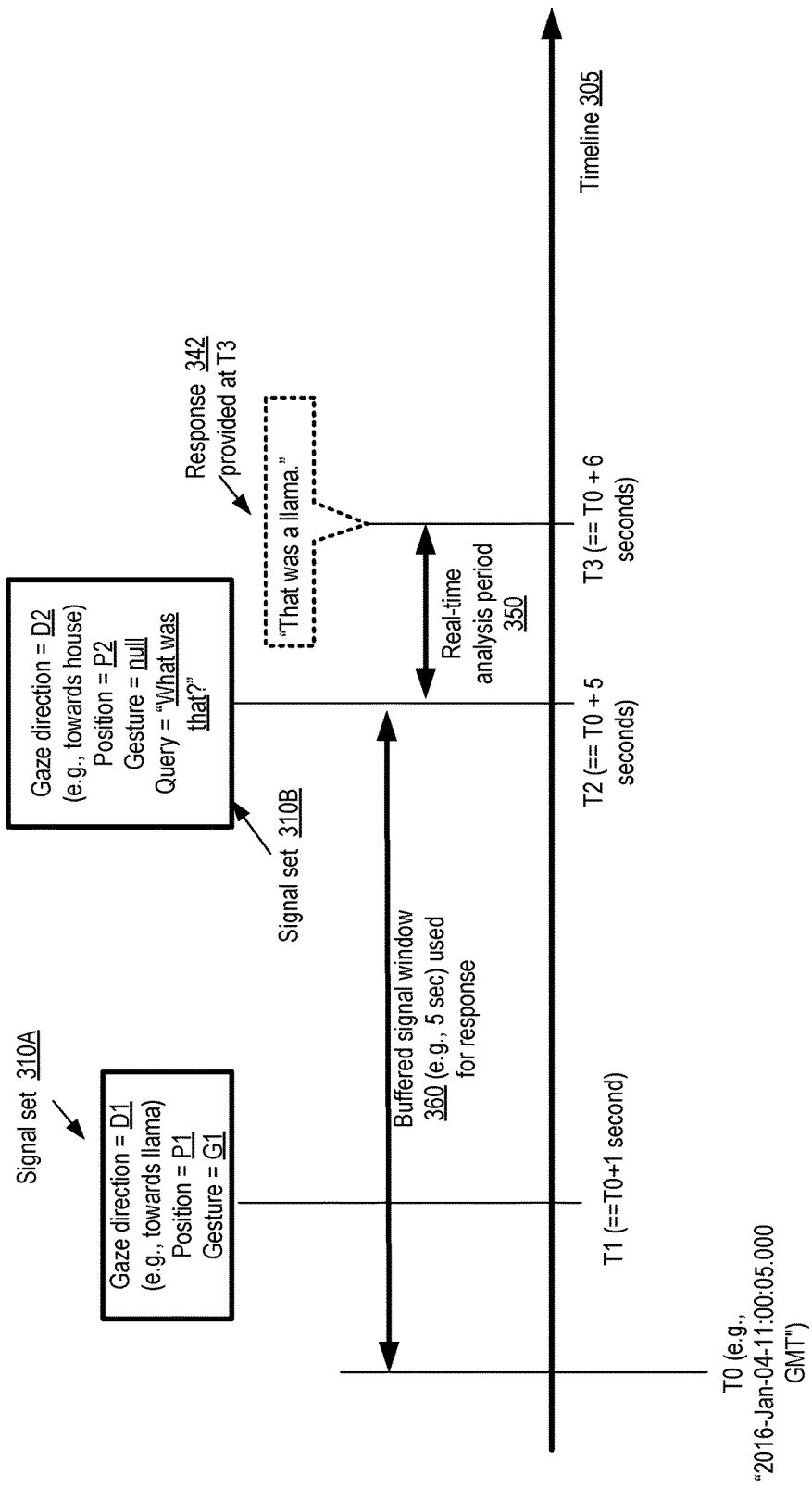
FIG. 3 illustrates an example timeline showing periods during which signals may be buffered in order to respond to queries directed to objects which may no longer be visible at the time that the queries are processed, according to at least some embodiments.

Especially in scenarios in which the individuals whose signals are being analyzed are moving fairly rapidly, the analysis may include generating temporal correlations between different groups of signals collected in the past, since some current signals collected at or near the time of command processing may no longer be relevant to the command. FIG. 3 illustrates an example timeline showing periods during which signals may be buffered in order to respond to queries directed to objects which may no longer be visible at the time that the queries are processed, according to at least some embodiments. Elapsed time increases from left to right along timeline 305. In the depicted example, signals collected over a rolling window 360 of the previous five seconds are buffered, and can be used to respond to queries/commands which may refer to objects or scenes encountered or viewed during the buffered signal window. Thus, signals collected during a time period beginning at T0 (11:00:05 GMT on Jan. 4, 2016 in the example shown) and ending at T2 (five seconds after T0) may be available for analysis when a query "What was that?" is detected at (approximately) T2.

The command processor being used (not shown in FIG. 3) may analyze the gaze, gesture and voice signals collected during the buffered signal window 360. In at least some embodiments, a grammatical analysis of the query by the command processor may indicate that because of the use of the word "was" rather than "is", an object that was viewed at some past point in time, before the issuance of the query, may be more likely to be the target object of interest. Multimodal signal analysis may enable the command processor to determine that at time T1 (approximately one second after T0), the individual whose signals are being analyzed had a gaze direction D1 (which was in the direction of a llama), a physical position P1 (close to the llama), and had made a gesture G1 (e.g. a pointing gesture) towards the llama. Depending on various factors (such as the relative lack of novelty of contents of the collected external environment data at other points during the window 360, the absence of other gestures during window 360, or the variation in gaze direction during other parts of window 360), the command processor may decide during real-time analysis period 350 that the signal set 310A should be used to respond to the query "What was that?". As a result, the llama may be selected as the object of interest most likely to be the target associated with the word "that" in the query, and the response 342 "That was a llama" may be provided at time T3 (approximately one second after the query). Note that the most current signal set 310B as of the time that the query is detected may indicate that the gaze G2 is now directed at a house, the position P2 is no longer near the llama, and no gesture (indicated by "null") is being made. That is, the command processor may not be able to rely on just the most recent set of signals to respond to at least some queries or commands in various embodiments. If, instead of "What was that?", the query happened to be "What is that?", the command processor may select the house (rather than the llama) as the targeted object of interest based on the use of the present tense verb "is", using signal set 310B whose gaze data is obtained in close temporal proximity to the query. The buffered signaling period duration and/or the real-time analysis period may vary in different embodiments.

Figure 4:
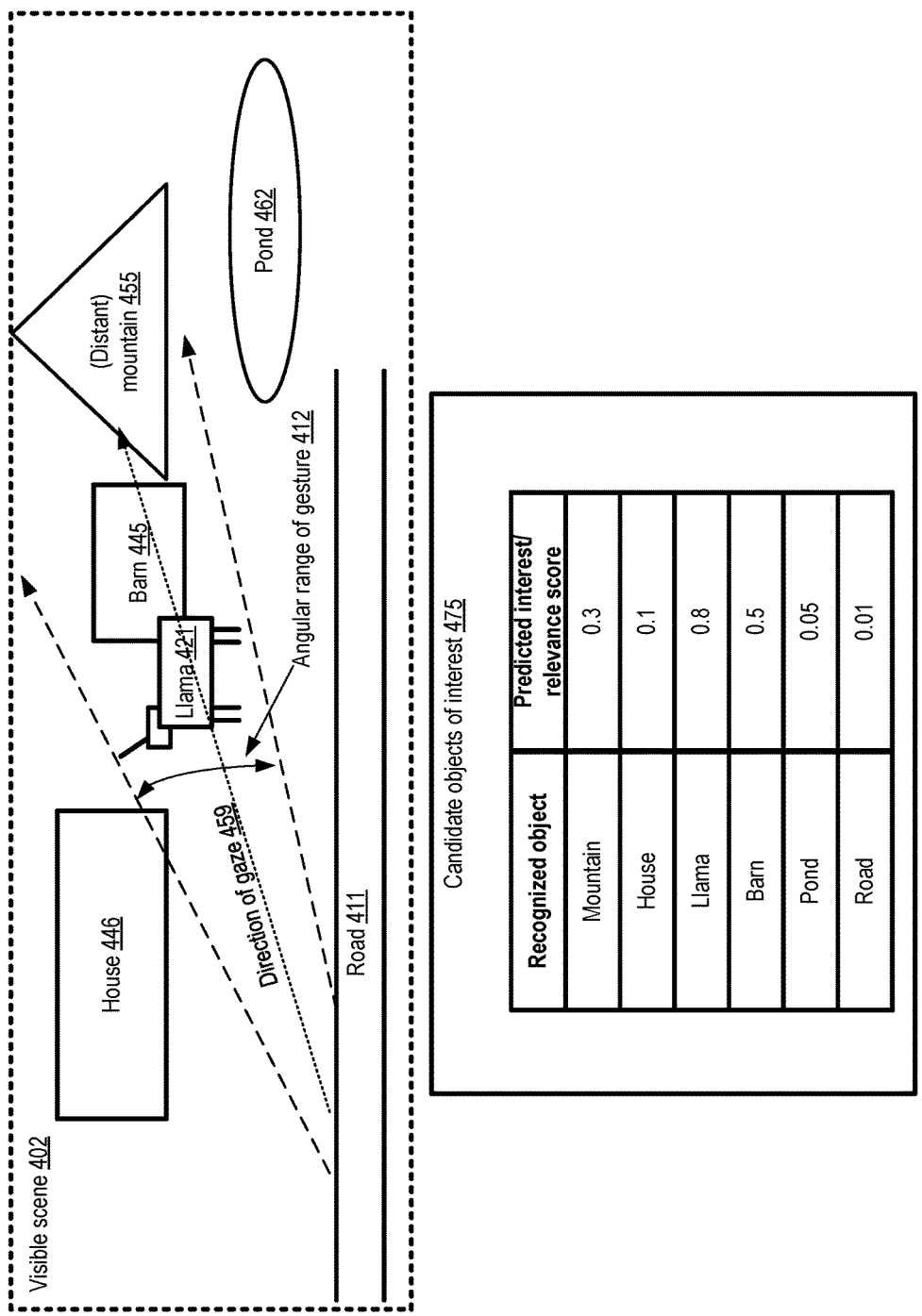
FIG. 4 illustrates an example of the assignment of respective interest scores to a plurality of candidate objects of interest, according to at least some embodiments.

In many cases, a number of different objects of interest may be identified, several of which may appear to be reasonable targets for a command or query. FIG. 4 illustrates an example of the assignment of respective interest scores to a plurality of candidate objects of interest, according to at least some embodiments. Such interest scores, which may also be referred to as relevance scores, may in some cases be generated using machine learning or artificial intelligence algorithms and used to prepare responses by the command processor. The algorithms used may comprise representations of a plurality of context-dependent rules or heuristics in some embodiments.

In the depicted example scenario, an individual occupies a moving vehicle (not shown) on a road 411. The visible scene 402 at some point of time, from the perspective of an external environment data source (such as an external facing camera of the vehicle), comprises six candidate objects of interest recognized as a result of the analysis of collected signals: a mountain 455 (which is fairly distant from the individual), a house 446, a barn 445, a llama 421, a pond 462, and the road 411.

The signal analysis may indicate that the individual's gaze was generally oriented along a direction corresponding to arrow 459, and a gesture (such as a pointing gesture of the hand) was directed somewhere within an approximate angular range 412. As indicated by the somewhat wide angular range 412 (and by the fact that the gaze could potentially have been directed towards several of the recognized objects, such as the mountain, the barn or the llama), a single type of signal may not be sufficient in at least some embodiments to unambiguously select a single target object of interest. In the example shown, the gaze data may help narrow down the range of objects which may be identified as candidates using the gesture alone. In other examples, a gesture may help narrow down the target objects of interest identified using the gaze alone.

In addition to the gaze and gesture data, the command processor may also use other data sources, including for example knowledge bases whose entries indicate anticipated levels of novelty associated with different objects in different geographical or cultural contexts. In some parts of the world, for example, a llama may be considered a more unusual (and therefore more "interesting") object than a house or a pond. In other parts of the world, a pond full of water or a snow-covered mountain may be considered more unusual or interesting than a llama. In at least some embodiments, such contextual information may be analyzed in combination with the multimodal signal data when multiple potential candidate objects of interest are identified, and a respective interest/relevance score may be predicted for at least some of the candidates. Any of several different types of context-related information may be used in various embodiments, including for example geographical context, cultural context, conversational context (e.g., the topics which were being discussed prior to the command being issued), or personal profile information of one or more of the individuals involved (which could include a history of previous interactions/commands of the individual, preferences with respect to cuisines, retail outlets, hotels, etc.).

In the depicted example scenario, the predicted scores lie within a range of 0 to 1, with a higher score indicating a higher predicted probability of the corresponding object being the target object to be used to respond to a command or query. The llama 421 may be assigned a relatively high score of 0.8, e.g., based on the combination of the gaze direction 459, the gesture angular range 412, a contextual indication of novelty, the relative proximity of the llama to the individual whose signals are analyzed, and so on. The barn, which generally lies in the same gaze direction, may be assigned a somewhat lower score of 0.5 based on a similar analysis of combined factors, with the mountain being assigned a score of 0.3. The house, which overlaps only slightly with the gesture, may be assigned a lower score of 0.1. The pond, which lies outside the gaze and gesture directions, may be assigned a score of 0.05, while the road may be assigned a score of 0.01. In response to a query such as "what was that?", the llama may be selected (at least initially) as the target object of interest of the query using its score ranking relative to the other candidate objects of interest.

Figure 5:
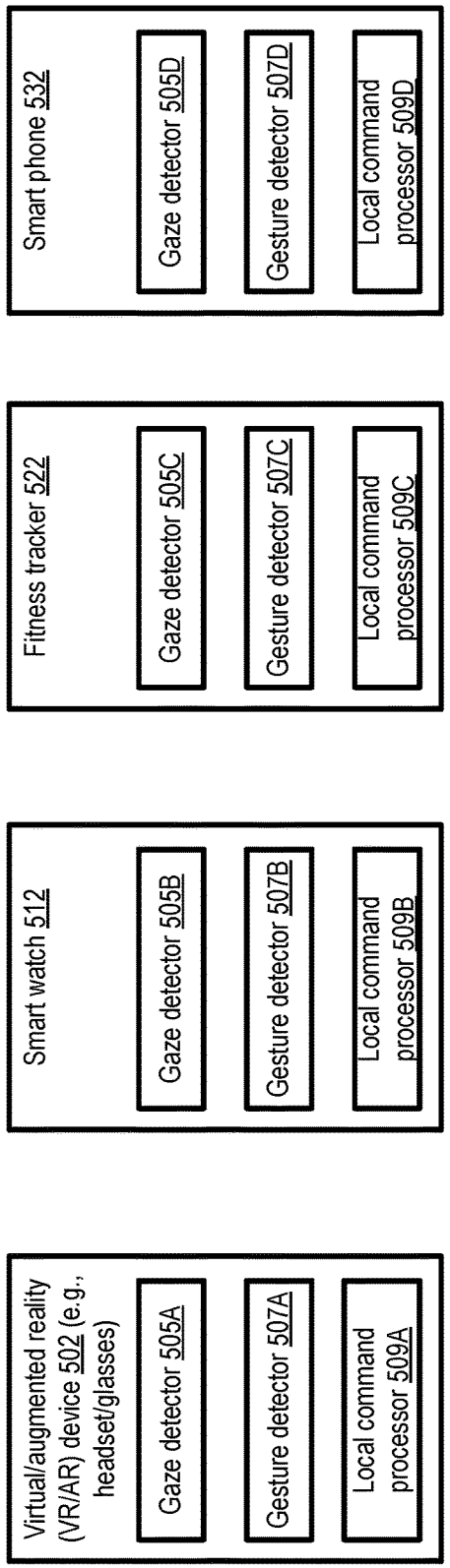
FIG. 5 illustrates examples of portable devices which may comprise gesture detectors, gaze detectors and/or local command processors, according to at least some embodiments.

At least some of the types of signal collection and/or analysis discussed above may be performed using various types of small-footprint devices that are in some cases worn or carried by individuals. FIG. 5 illustrates examples of portable devices which may comprise gesture detectors, gaze detectors and/or local command processors, according to at least some embodiments.

In at least one embodiment, the object of interest referred to in a command or query by the individual, or the object selected as the target object of a command or query by the multimodal analysis system, may be a virtual object defined in a virtual reality (VR) environment or an augmented reality (AR) environment. A wearable VR/AR device 502 (e.g., a headset, helmet or suit) which contains hardware and/or software components used to simulate environments and/or to superimpose additional information onto views of the existing external environment of an individual may comprise a gaze detector 505A, a gesture detector 507A, and/or a local command processor 509A in some embodiments. In one embodiment, a smart watch 512 may comprise another type of a gaze detector 505B, a gesture detector 507B, and/or a local command processor 509B. A fitness tracker 522 may be used to collect gesture and gaze signals (e.g., using respective detectors 505C and/or 507C) for local processing at command processor 509C in some embodiments. A smart phone 532 may comprise its own gesture detector 505D, gaze detector 507D and/or local command processor 509D in various embodiments.

It is noted that the functional capabilities of the signal detectors and/or local command processors may differ from one example portable device to another. For example, the accuracy of the gaze direction detected at a VR headset may be much higher than the accuracy of the gaze direction detected at a fitness tracker or smart phone. In at least some embodiments, not all the signal detectors at a given portable device may be able to capture useful data on a continuous basis (even when the device happens to be in close proximity to the individual whose signals are to be collected)—for example, a smart watch or fitness tracker may only be able to capture gaze-related data during periods when the watch or fitness tracker happens to be in a position in which the individual's eyes lie within the range of a gaze detector of the watch or tracker. In some embodiments, the responses to the command/queries issued by the individual may be generated on a best-effort basis, given the signal data available—that is, if gaze signals are not available, an attempt to respond to a command may be made based on gesture signals alone, and vice versa. In some such embodiments, if and when the confidence or certainty level associated with a particular object of interest by the command processor(s) is below a threshold, an interactive dialog may be initiated with the individual by the command processor(s) in an attempt to confirm that the object of interest has been identified correctly. Depending on the computational capacity of the local command processors of the devices shown in FIG. 5, a substantial portion of the analysis required to respond to the individual's commands/queries may be performed at remote command processor(s) in some embodiments, e.g., at servers located at one or more data centers. At least some of the results of the processing may be transmitted back to the local command processors or local user interfaces from the remote command processors, so that the results can be provided to the individuals who issued the commands.

In at least some embodiments, a combination of portable and non-portable sensing devices and/or command processors may be employed on behalf of a given individual. For example, if the individual happens to be holding their smart phone in one hand, the smart phone's positioning and movement may indicate the gestures made by the individual, while a camera (located in a car occupied by the individual, or in a room occupied by the individual) may be used to capture gaze data.

Figure 6:
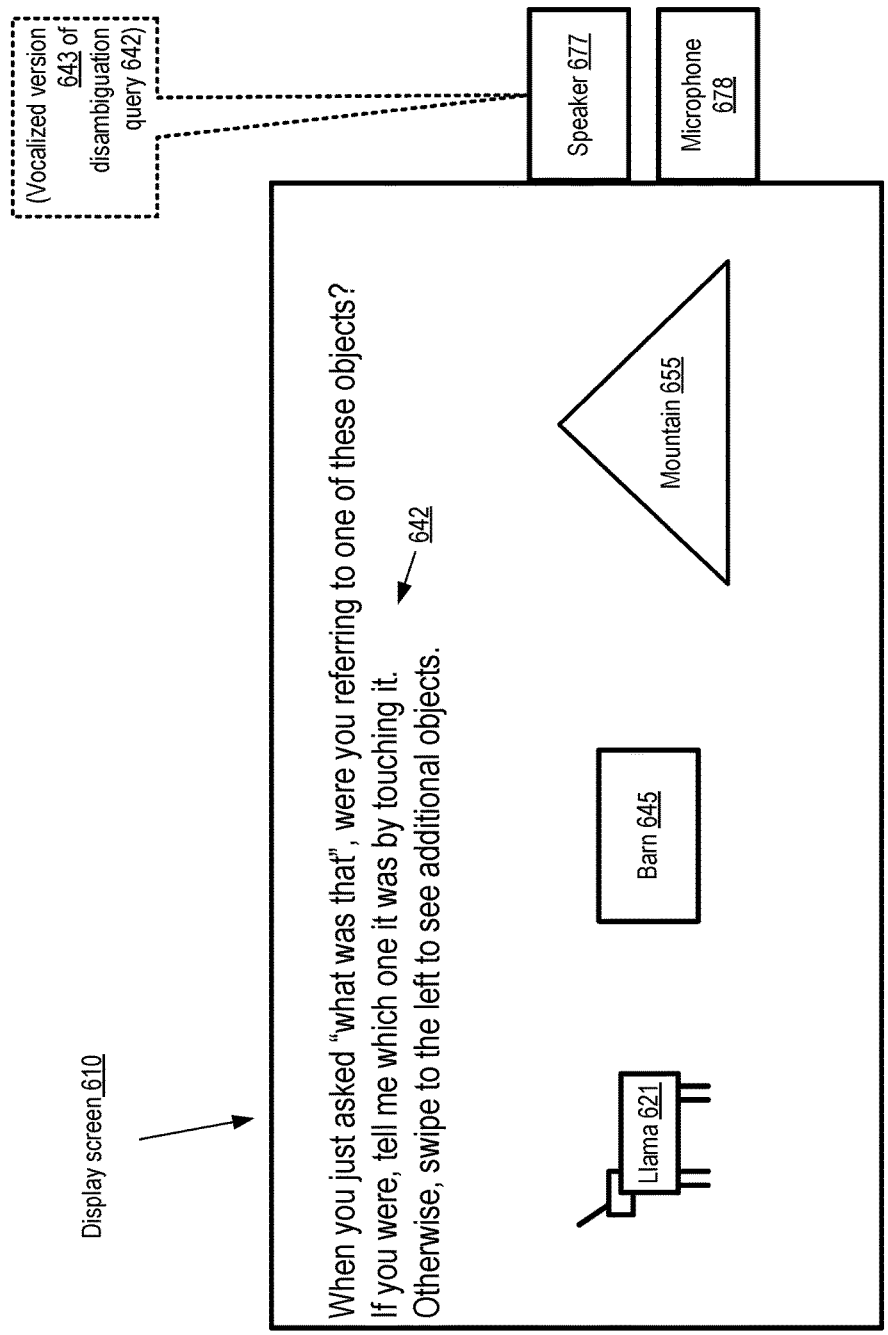
FIG. 6 illustrates an example of a disambiguation-related interaction between a command processor and a source of a query or command, according to at least some embodiments.

As mentioned earlier, in some cases a plurality of candidate objects which may each be the target of an individual's command or query may be identified based on multimodal signal analysis. Several such objects may have non-negligible and similar predicted probabilities of being the target object of interest in some scenarios. In at least one embodiment, the command processor may attempt to confirm its selection of a target object of interest using one or more programmatic interactions with the individual, which may be referred to as disambiguation-related interactions. FIG. 6 illustrates an example of a disambiguation-related interaction between a command processor and a source of a query or command, according to at least some embodiments.

In the depicted embodiment, a display screen 610 (e.g., a touch pad screen which may be mounted in a car, or a screen of a phone, or smart watch, or a similar screen of a VR headset, AR glasses, etc.) may be used for the interactions. An individual may have issued the query "what was that" to the multimodal signal analysis system in the depicted embodiment shortly before the contents of display 610 are presented to the individual. A disambiguation query 642 may be displayed on the screen 610 in the depicted embodiment, in which the individual is asked, in a conversational manner, to confirm whether one of the objects displayed on the screen (llama 621, barn 645 or mountain 655) is the target object to which the query was directed (e.g., by touching the target object's representation on the screen to provide a disambiguation response, by directing the individual's gaze to the target object's representation on the screen and blinking, or using some other feedback mechanism). An option to view other candidate objects of interest may also be provided, which may be exercised by an interaction such as swiping the screen to the left or a vocalized rejection of the displayed objects. In at least some embodiments, instead of or in addition to the displayed version of disambiguation query 642, a vocalized version 643 of the query may be provided, e.g., using a speaker 677. Similarly, in some embodiments, instead of requiring the individual to disambiguate among the objects via a touch interface, a vocalized disambiguation response from the individual, detected via a microphone 678 (e.g., "Yes, it was the mountain") may be used.

In one embodiment, the interaction interfaces used for disambiguation (e.g., whether a disambiguation query and the corresponding response involve the use of a visual display 610, vocalized interactions are used, or both visual and vocalized interactions are used) with respect to a given query or command may be selected by the command processor depending on various factors. Such factors may include, for example, the complexity of the action requested, an estimate of the potential costs associated with making an incorrect selection of the target, the number of candidate objects with similar interest/relevance scores predicted, the time of day (which could affect the visibility of a screen), the ambient level of sound (which could affect the ability to hear vocalization interactions) etc. For example, if the individual issues the command "park over there" from within a self-driving car, the system may attempt to confirm what "there" meant to a higher level of confidence than if the command was "take a picture of that" and the system had to confirm what "that" meant (under the assumption that the consequences of taking a picture of the wrong object may typically be smaller than the consequences of attempting to park in an undesired location).

Figure 7:
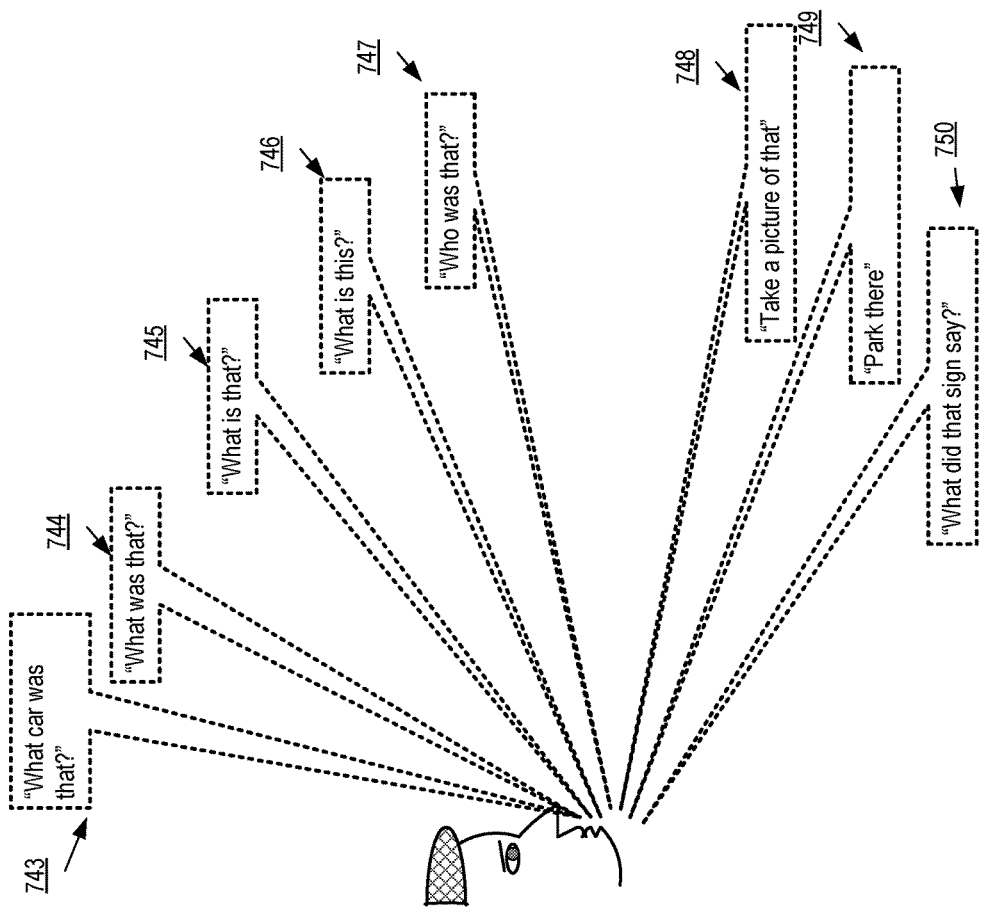
FIG. 7 illustrates example commands and/or queries which may be directed towards a system designed to interpret multimodal signals including gestures and gaze changes, according to at least some embodiments.

A wide variety of categories of potentially ambiguous or imprecise commands may be handled using the multimodal signal analysis techniques described herein. FIG. 7 illustrates example commands and/or queries which may be directed towards a system designed to interpret multimodal signals including gestures and gaze changes, according to at least some embodiments. In example 743, the individual may generate a domain-specific query such as "What car was that?", which may have as its target a particular car seen in the past few seconds from within the query issuer's car, for example. In order to respond to such a query, in some embodiments the command processor may utilize a corresponding domain-specific database, e.g., a database of various car models. The command processor may filter out all the objects which are not clearly identifiable as cars from the external environment data, rank the car objects which remain after the filtering based on the individual's gaze or gesture, and match the car objects in sorted rank order with the database in order to respond.

The second type of query "What was that?" 744 may be detected as referring to the past (e.g., due to the use of the past tense verb form "was" as mentioned earlier), and buffered signal data may be used to respond as also discussed earlier in the context of FIG. 3. In contrast, the query "What is that?" 745 may indicate that the target object is currently visible at the time that the query is issued/detected (e.g., due to the use of the present tense verb form "is"), which may help narrow down the possibilities to a different set of candidates than in the case of query 744.

In at least some embodiments, the multimodal signal analysis system may be able to infer distance-related information pertaining to the target object of interest based on distinguishing between words such as "this" and "that". For example, the query "What is this?" 746 may be interpreted as referring to an object that is relatively near the individual (e.g., as compared to the case where the query was "What is that?"), and such a distance-associated interpretation may be used to assign higher interest/relevance scores to nearby objects than to more distant objects.

In some cases, queries or commands may pertain to other individuals. In order to respond to a query such as "Who was that?" 747, in some embodiments a database of well-known personalities or celebrities may be examined, or (if access to such a database has been granted) a personalized database such as a contacts list associated with the individual's phone, e-mail accounts or social media accounts may be examined by the multimodal signal analysis system. In one embodiment, if the system is unable to identify a target person by name in response to a query such as "Who was that?", but is able to characterize one or more individuals that may be candidate targets of the query, a generic response similar to the following may be provided: "That appeared to be a male, approximately six feet tall, dressed in a light jacket. Can you tell me any more information that could be used to identify the person?" In embodiments in which personal databases such as contact lists may be used, permissions to access such databases may be obtained by the system beforehand—e.g., the individual for whom the multimodal analysis system is employed may grant such access using an "opt-in" mechanism.

In the examples 743, 744, 745, 746, and 747, the multimodal analysis system may simply provide a name or identifier of the selected candidate target object to the query source in the depicted embodiment—that is, the operation performed in response to the query comprises naming a target object. In some cases, the naming may involve translation words and/or symbols—e.g., the individual from whom the query is received may be traveling within a country in which the language spoken differs from the individual's native language, and the analysis system may provide names/identifiers in the individual's native language if desired (or in both the non-native language and the native language). In one embodiment, the name of a target object may first be provided in a local language, and then optionally translated at the request of the individual to whom the name is provided.

In at least one embodiment, the actions taken in response to a command may include producing and/or saving a record of some kind—e.g., a photograph or video may be taken (as in the case of command 748 "Take a picture of that"). In some embodiments, the picture or video may be automatically transmitted to some desired destination—e.g., to a remote photo/video backup service, to friends or contacts of the individual that requested the photo/video, to a law enforcement agency (if a suspicious activity or scene was the subject of the photo or video) or the like.

As mentioned earlier, in some embodiments the multimodal analysis system may be deployed within a car or other vehicle which supports at least some driverless operations—e.g., in the case of the command "Park there" 749, the system may cause the vehicle to be parked in a selected parking spot or parking lot (in some cases, after confirming what was intended by the word "there").

In various embodiments the multimodal analysis system may be used as a navigational aide—e.g., the individual may issue the query "What did that sign say" 750 to check the distance to a destination, determine the cost of a toll, determine which exit should be taken from a highway, and so on. In some embodiments, the system may translate sign contents to the individual's preferred or native language if needed. A wide variety of categories of other natural-language based commands or queries may be supported in different embodiments. As mentioned earlier, one of the goals of the multimodal signal analysis system may be to provide information about (or cause other operations to be performed with respect to) objects or places predicted to be of interest to the individual using the individual's natural behavior and language patterns, without forcing the individual to utilize a constrained query language or interface.

Figure 8:
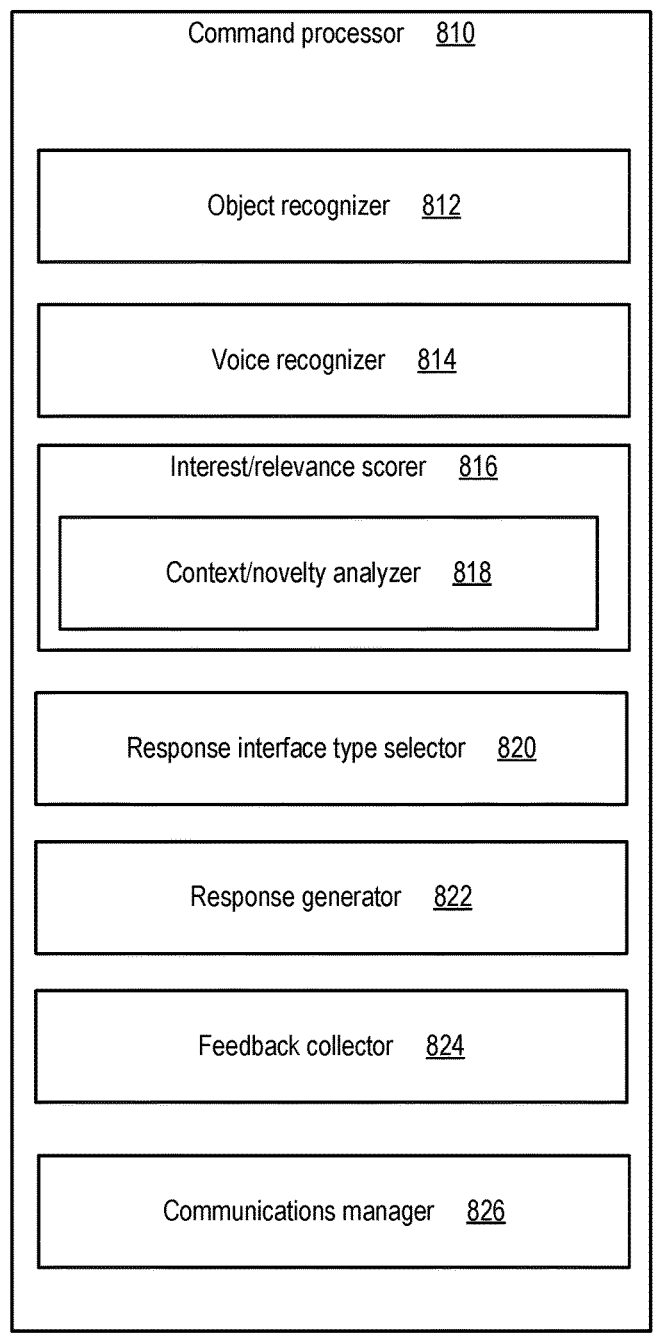
FIG. 8 illustrates example subcomponents of a command processor which obtains and analyzes multimodal signals, according to at least some embodiments.

FIG. 8 illustrates example subcomponents of a command processor which obtains and analyzes multimodal signals, according to at least some embodiments. As mentioned earlier, the functionality of the command processor may be implemented using a distributed combination of local and remote (with respect to proximity to the individual(s) whose commands are being processed) computing resources in at least some embodiments. For example, in one embodiment, the gathering of the gaze and gesture signals and the query/command signals may be performed within a vehicle occupied by the individual, while at least some of the analysis of the signals may be performed at a remote data center to which network connectivity is established from local system components within the vehicle. At least some of the analysis may be performed at local command processor components (e.g., components incorporated within the vehicle occupied by the individual in the above example) in various embodiments.

As shown, the command processor 810 may comprise an object recognizer 812, a voice recognizer 814, an interest/relevance scorer 816, a response interface type selector 820, a response generator 822, a feedback collector 824, and/or a communications manager 826 in the depicted embodiment. In some implementations, individual ones of the command processor subcomponents shown in FIG. 8 may comprise one or more hardware and/or software devices, modules or processes/threads of execution. In at least one embodiment some of the functions of the command processor (such as object recognition) may involve the use of a separate framework or service—e.g., a machine learning framework which supports convolutional neural network models may be invoked by the command processor 810 for object recognition.

The signals collected from the external environment data source (e.g., data sources 112 of FIG. 1 such as still or video cameras) may be provided, in raw or partially processed form, as input to the object recognizer 812 together with gaze and gesture signals in some embodiments. The candidate objects of interest may be identified by the object recognizer 812 using such input. The voice recognizer 814 may be responsible for determining the content of the commands or queries issued by the individual, e.g., using various natural language processing algorithms. In at least some embodiments the voice recognizer 814 may be trained to recognize the speech of specific individuals—e.g., a given voice recognizer, trained on the speech patterns of one individual over some time interval, may be able to distinguish the words spoken by that individual with greater accuracy than words spoken by other individuals.

The interest/relevance scorer 816 may, for example, utilize a context or novelty analyzer 818 in the depicted embodiment to arrive at the kinds of scores or rankings shown in FIG. 4 with respect to various candidate objects of interest. Context analysis may comprise, for example, determining the topics or objects (if any) that were being discussed prior to (and/or shortly after) the command or query for which a response is to be prepared. Novelty analysis may comprise, for example, determining which of a pair of candidate objects is more unusual or unexpected, e.g., in the current geographical, cultural or conversational context, which may be helpful in selecting target objects of interest for some types of queries or commands.

In at least some embodiments, several different communication mechanisms or interface types may be available for providing a response to a command or query, including for example graphical/visual interfaces such as touch screens (including two-dimensional or three-dimensional displays), voice generators, and the like. The response interface type selector 820 may choose, from among the available interfaces, one or more interfaces to be used to respond to a given query or command based at least in part on the nature of the query/command, the interface using which the query/command was detected, the relative consequences of making an incorrect selection of a target object of interest, the ambient environmental conditions (e.g., the noise level and/or screen visibility) and so on. In some cases, as in the case of a response to a parking command or to a command such as "drive there", the multimodal analysis system may confirm its interpretation of the command/query using multiple interfaces to decrease the probability of a wrong interpretation being used to take an action which was not actually intended. The response generator 822 may format at least a portion of the response (e.g., displayed words on a screen) appropriately and provide the response via the selected interfaces.

The feedback collector 824 may coordinate the analysis of signals which indicate whether the command/query was interpreted correctly in the depicted embodiment, and/or whether the target object of interest selected by the command processor was the one intended by the individual on whose behalf the command/query is being processed. In those embodiments in which the analysis of the collected signals is performed in a distributed fashion, a communications manager may be responsible for selecting and utilizing the appropriate communication mechanisms (e.g., wireless communications using telecommunication provider infrastructure, Wi-Fi routers or the like, wired communication via Ethernet or the like) for messages used for the multimodal signal analysis. In at least some embodiments, one or more of the subcomponents shown in FIG. 8 may not be employed, or a different set of subcomponents may be utilized by a command processor.

Figure 9:
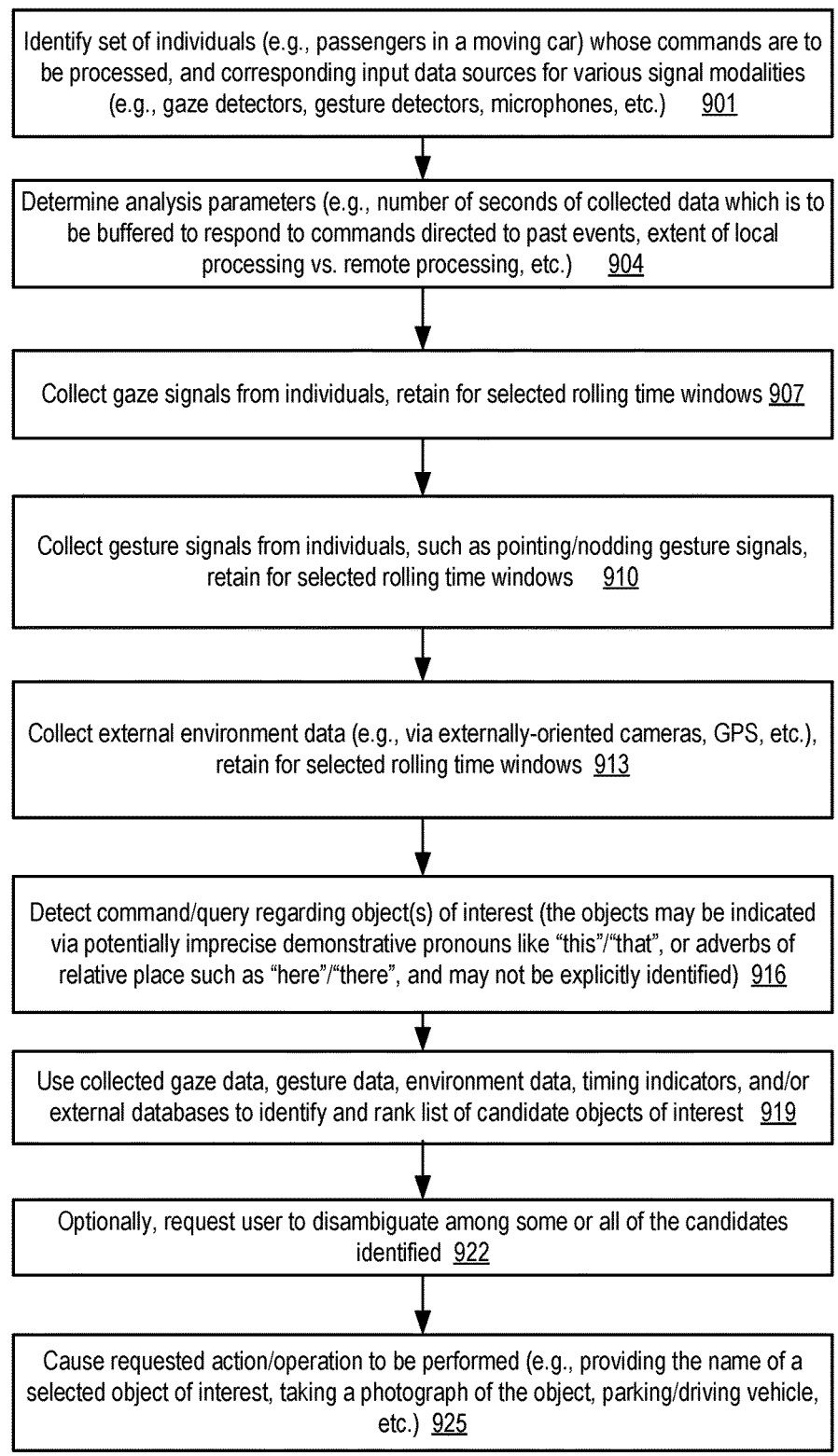
FIG. 9 is a flow diagram illustrating aspects of operations which may be performed at a system which detects and interprets multimodal signals to respond to natural language commands and queries, according to at least some embodiments.

FIG. 9 is a flow diagram illustrating aspects of operations which may be performed at a system which detects and interprets multimodal signals to respond to natural language commands and queries, according to at least some embodiments. In FIG. 9, gaze and gesture are used as the example signal modalities on the basis of which responses to commands are generated. As mentioned earlier, other signal modalities may be used in different embodiments. As shown in element 901, a set of individuals whose commands or queries are to be processed, as well as the input data sources responsible for sensing signals regarding the behavior/movements of the individuals and the objects/places in the environment of the individuals may be identified. A mapping between the available input signal sensors for each signal modality (e.g., gaze, hand gestures, head/neck/torso gestures) and the individuals may be determined—e.g., if there are four hand gesture detectors and two individuals in a vehicle, a respective pair of gesture detectors may be designated for each individual. In some implementations, the orientations or positions of some of the sensing devices (e.g., cameras) may be adjusted based on such mappings—e.g., the direction of the lens plane of an adjustable camera may be changed to capture the hand gestures of the particular individual for which the camera has been designated.

One or more parameter values pertaining to the multimodal analysis may be set (element 904) in some embodiments, such as the respective number of seconds for which gesture signals, gaze signals, voice signals, and/or external environment signals are to be retained for responding to queries/commands directed at objects or places encountered in the past, the breakdown of local vs. remote processing (i.e., which analysis functions are to be performed locally at devices near to the individuals, and which analysis functions are to be performed at remote servers), and so on.

Gaze signals may be collected from the targeted individual(s) using the gaze data collectors, and retained for the selected rolling time window durations (element 907). Similarly, gesture signals may be collected and retained for selected time windows (element 910) and external environment signals may be collected and retained for selected time windows (element 913) in the depicted embodiment. The time windows for which each type or mode of signal is retained may not necessarily be identical for all signal types in some embodiments—e.g., depending on the storage capacity available and the encoding algorithms used for the signals, it may be the case that gesture signals may be retained for T1 seconds while gaze signals are retained for T2 seconds.

A command or query directed to an object of interest may be detected (element 916), e.g., using a microphone coupled with a voice recognizer or some other input interface. In at least some cases the target object(s) to which the command or query is directed may not be explicitly specified. Instead, imprecise indicators including, for example, demonstrative pronouns such as "this" or "that" may be used (as in the query "What was that?") or adverbs of relative place such as "here" or "there" may be used (as in the command "Park over there"). In various embodiments, a given command may sometimes provide a partial identification of the targeted object or objects of interest, but the contents of the command may not be sufficient to conclusively or definitively identify the object or objects. It is noted that the multimodal analysis system may be able to respond to queries or commands with a wide range of specificity regarding the target object or place—e.g., commands such as "What was that?", "What car was that?", "What model was that red car?", or "What model was that red convertible with the California license plates?", each of which has a different level of detail regarding the target object of interest, may all be processed with equal success by the analysis system in at least some embodiments. Various types of voice recognition and/or natural language processing algorithms may be employed to interpret the query or command in different embodiments.

Using some combination of the signal data collected, including for example the gaze data, the gesture data, and the environmental data, a ranked list of candidate objects of interest to which the query or command may have been directed may be generated (element 919). In some embodiments, the various types of signal data may have associated timestamps, and the timestamps may be used to correlate signals which were obtained at the different sensors simultaneously or near-simultaneously. In at least one embodiment, signals of one category may be used to filter out (or rank) objects identified using signals of another category—e.g., while a gesture may broadly indicate that the intended target object could be a llama, a barn or a mountain, gaze signals may suggest that the intended target object is more likely to be the llama than the mountain. A variety of correlation-based analyses (e.g., involving at least some level of temporal correlation, spatial correlation or the like between different sets of data or signals) may be performed to identify and/or rank candidate objects of interest in different embodiments.

In at least one embodiment, if for example the rankings (e.g., interest scores or relevance scores) predicted for several different objects happen to be close to one another, or if a wrong selection of a target object may have substantial negative side effects, the system may request the individual from whom the query or command was detected to disambiguate or confirm the choice of the target made by the system (element 922). The requested action or operation (which may for example be something as simple as naming the target of the word "that" in the query "What was that?", or something more substantial such as parking a vehicle in response to the command "Park over there") may be caused or initiated with respect to a selected target object of the list of objects (element 925). The particular object with respect to which the operation is performed may be selected based at least in part on the interest/relevance score assigned to it in some embodiments. Feedback regarding the performed operation(s)—e.g., whether the target object was selected correctly or not—may be collected in some embodiments and used to improve the functioning and/or performance of the system over time. In one embodiment, if and/when the individual whose command or query was processed indicates that the system chose an incorrect object as the target object of interest, one or more additional objects of interest may be identified (e.g., from the original list of candidates or from a newly-generated list of candidates), and the requested operation may be performed in order on the additional objects until the command/query response is acceptable or the command/query is abandoned by the individual or the system.

In some embodiments, the identification of candidate objects of interest may only be performed after a command or query is received. In other embodiments, the multimodal analysis system may be configured to identify candidate objects of interest (and/or rank such candidates relative to one another based on interest/relevance scores) on an ongoing basis, e.g., independently of whether a command/query is received or not, so that if and when a command or query is received, the response may be generated more quickly than if the candidate objects of interest had not been identified in advance.

Figure 10:
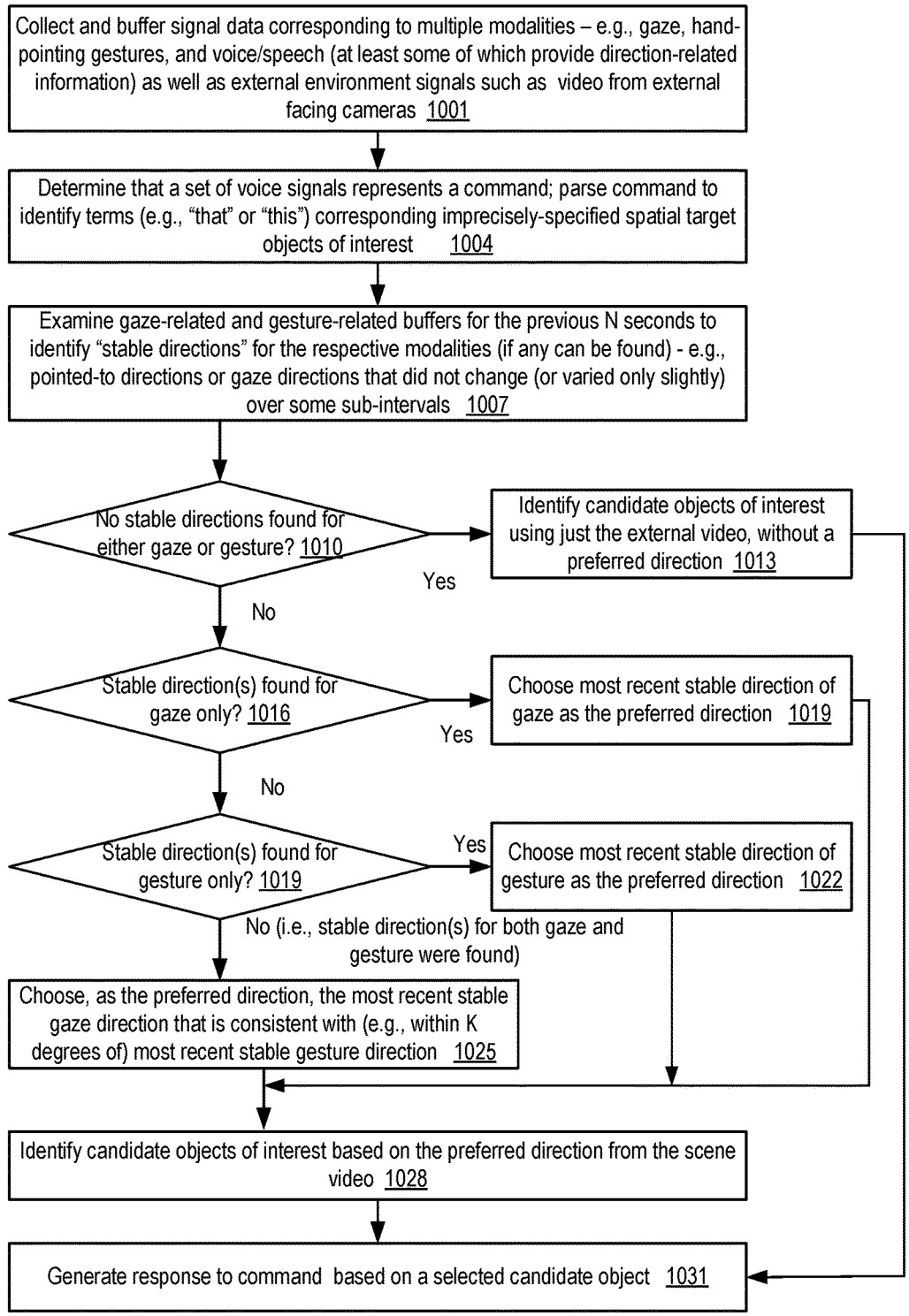
FIG. 10 is a flow diagram illustrating aspects of example operations which may be performed to identify candidate objects of interest in scenarios in which data from one or signal sources may be unavailable or degraded at least temporarily, according to at least some embodiments.

FIG. 10 is a flow diagram illustrating aspects of example operations which may be performed to identify candidate objects of interest in scenarios in which data from one or signal sources may be unavailable or degraded at least temporarily, according to at least some embodiments. Gaze, gesture and voice signals are collected in the embodiment depicted in FIG. 10, although other combinations of modalities may be used in other embodiments. As shown in element 1001, gaze, hand-pointing gestures and voice/speech signals from one or more individuals may be collected and buffered, e.g., for respective buffering intervals for the different modalities. At least some of the signals may comprise information indicative of a direction (relative, for example to the position(s) of the individual(s) at some point in time during the buffering intervals) in which objects of interest may have been located. Different buffering intervals may be used for the different modalities in some embodiments, while identical buffering intervals may be used for more than one modality in other embodiments. In addition, external environment signals may also be collected and buffered, e.g., using external facing cameras such as those discussed in the context of FIG. 2.

A determination may be made that some combination of voice signals represents a command (element 1004), e.g., using voice recognition and/or natural language processing algorithms. The command may be parsed, and the results of the parsing may indicate that at least some spatial object of interest targeted by the command is imprecisely specified—e.g., using words such as "this", "that", "here" or "there" as discussed earlier.

The buffers containing gaze-related and/or gesture-related data may then be examined in an attempt to identify "stable directions" with respect to each of the modalities in the depicted embodiment (element 1007). For example, the signals collected over the most recent N seconds (where N may be a tunable parameter of the analysis algorithm) may be analyzed to determine whether a given individual gazed generally in the same direction (e.g., within a range of a few degrees around a specific direction) for some sustained time period, or pointed generally in the same direction using a hand for some sustained period. For example, with respect to gaze, eye fixations (representing a steady gaze direction) and/or smooth pursuit eye movements (indicating slight variations in gaze directions) may be detected to identify stable directions. The minimum durations of the sustained periods and the extent of slight changes in direction (the maximum number of degrees the gaze or gesture may shift to still be considered sustained) may also be tunable parameters of the analysis. If one or more such periods of sustained gaze and/or gesture direction are found, the identified directions may be labeled as respective stable directions in the depicted embodiment. However, it may sometimes be the case that no stable directions are identified with respect to one or more of the modalities within the set of buffered signals that are examined. This may occur for a variety of reasons, including for example a temporary loss of communication with the signal source, corruption of network packets which carried the signal data, or because the behavior of the concerned individuals did not actually include any sustained periods of consistent gaze direction or gestures. At least in some scenarios, the analysis algorithm may nevertheless be able to identify one or more candidate objects of interest as described below.

If no stable directions are identified (as determined in operations corresponding to element 1010) with respect to either gaze or gesture, an attempt may be made to generate a list of one or more candidate objects of interest using the external environment signals alone, without taking specific directions into account (element 1013). For example, object recognition algorithms applied to video signals may yield a set of different objects, and some subset or all of those objects may be designated as candidates.

If one or more stable directions are identified for gaze only (as detected in operations corresponding to element 1016), the most recent among those stable directions may be designated as the preferred direction (element 1019) with respect to identifying objects within the collected video signals in the depicted embodiment. Similarly, if one or more stable directions are identified only with respect to gestures (as detected in operations corresponding to element 1022), the most recent among them may be designated as the preferred direction (element 1025).

If stable directions are identified with respect to both gaze and gesture (i.e., if none of the conditions checked in operations corresponding to elements 1010, 1016 and 1019 are met), correlation analysis between the stable directions of the two modalities may be performed in the depicted embodiment to identify a preferred direction. For example, the most recent stable gaze direction which is consistent with (e.g., within K degrees of) the most recent stable gesture direction may be selected as the preferred direction (element 1025). Regardless of which combination of modalities was used to identify the preferred direction, one or more candidate objects of interest may be identified from the external signal data based on the preferred direction (element 1028), assuming of course that at least one object identified from the external signal data was positioned in the same general direction as the preferred direction. As discussed earlier, the candidate objects may be ranked based on various factors in different embodiments, and the ranking may be used to respond to the command (element 1031). It is noted that in some cases, the command itself may include hints which can help to narrow down the candidate objects of interest. For example, if the command comprises the query "What do they serve at that restaurant?", this may indicate that objects which could be characterized as restaurants should be identified (followed by determining, if possible, the type of cuisine served at the restaurants). Similarly, if the command comprises the query "What kind of car is that?", this would suggest not only that the objects of interest should be restricted to those which could represent cars, but may also suggest that unusual (rather than common) car types should probably be assigned higher weights/scores among the candidate car types identified.

Multimodal signal analysis algorithms that function successfully in the presence of missing signal data may be more sophisticated in various ways than the relatively simple version illustrated in FIG. 10 in at least some embodiments. For example, relative weights indicative of the respective precision of the direction which can be detected using various modalities may be used in the analysis in some embodiments, ranks may be assigned to different modalities when identifying preferred directions, and so on. Iterative approaches may be taken with respect to the laxity or leeway of various conclusions made during the analysis (e.g., if a stable direction cannot be found within a range of D degrees, a range of [D+delta] degrees may be used in a subsequent iteration, or if a stable direction cannot be found with respect to a sustained duration of 250 milliseconds, a duration of 200 milliseconds may be used in a subsequent iteration, and so on.) More than two signal modalities may be used in some embodiments—e.g., in addition to gaze and hand-pointing gestures, head motions may be used in one embodiment. The addition of such a third modality would, of course, lead to an increase in the number of combinations which have to be considered with respect to missing and detected stable directions, from the four combinations indicated in FIG. 10 ((1) stable directions identified for neither gaze nor hand-pointing gestures, (2) stable direction(s) identified for gaze but not for hand-pointing gestures, (3) stable direction(s) identified for hand-pointing gestures but not for gaze and (4) stable direction(s) identified for both gaze and hand-pointing gestures) to eight combinations. In general, for N direction-related modalities, up to $2^N$ such combinations may have to be considered in the algorithm.

It is noted that in various embodiments, at least some operations other than those illustrated in the flow diagrams of FIG. 9 and FIG. 10 may be used to implement the multimodal signal analysis techniques described above. Some of the operations shown may not be implemented in some embodiments or may be implemented in a different order, or in parallel rather than sequentially.

Figure 11:
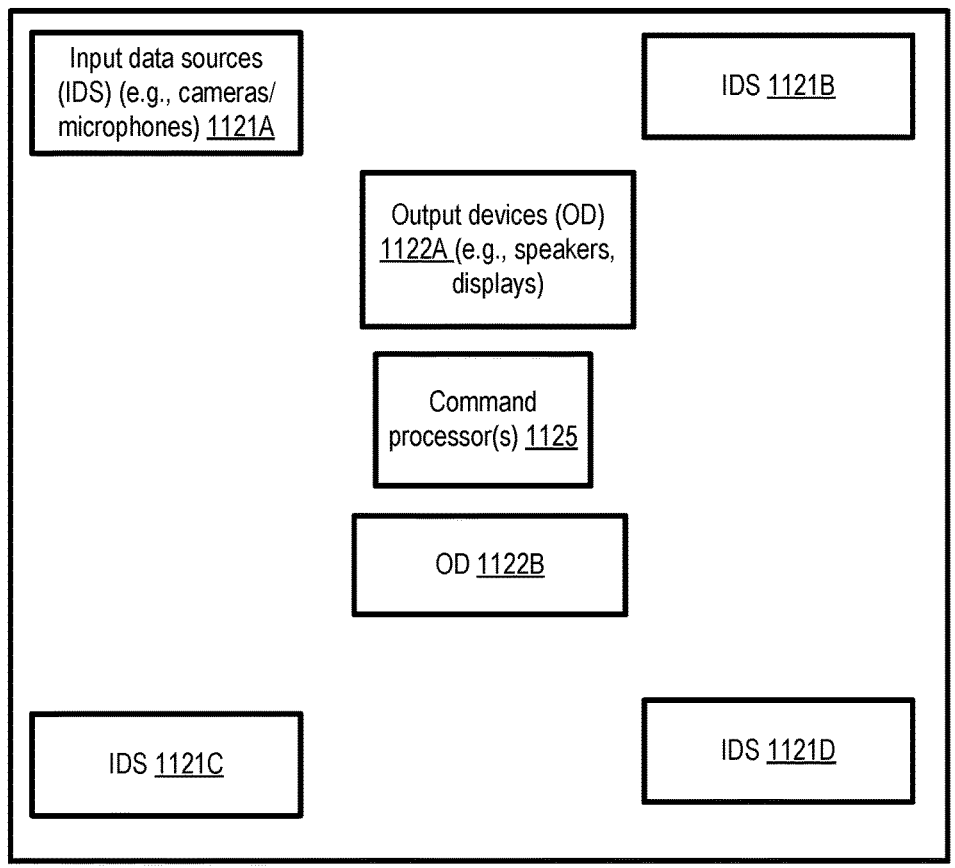
FIG. 11 illustrates an example scenario in which multimodal signal analysis may be performed within a room of a building, according to at least some embodiments.

Generally speaking, the techniques and algorithms for multimodal signal analysis described above may be used with equal success within moving environments (as in the case of a vehicle such as that shown in FIG. 2) as well as stationary environments. FIG. 11 illustrates an example scenario in which multimodal signal analysis may be performed within a room of a building according to at least some embodiments. A top-down view of a room 1110 (such as a retail store or a room within an individual's home) is shown. Objects not directly relevant to performing multimodal signal analysis, such as furniture in the case of a living room, or products stocked in a retail store, are not shown in FIG. 11. The room 1110 may comprise a plurality of input data sources (IDSs) 1121A-1121B, such as a variety of cameras, microphones and the like. Signals corresponding to several different modalities of the kinds discussed above, such as hand or body gestures, gaze, facial expressions, physiological responses, etc., may be captured from one or more individuals present in the room using some combination of IDSs 1121 in the depicted embodiment. The individuals themselves may be stationary, or may be moving (e.g., walking from one part of the room to another). At least some of the signals may provide an indication of a spatial direction relative to the individual from which the signals are obtained. In some embodiments, at least some of the input data sources may be movable (e.g., the orientation of a camera's lens or a microphone may be modified to more clearly capture signals from an individual who may be moving within the room).

Some of the IDSs 1121 may provide an indication of the issuance of a command or query issued by an individual. The command may, for example, be expressed in natural language rather than in any restricted query language, and may not necessarily explicitly, conclusively or definitively identify a particular object of interest to which the command is directed in at least some embodiments. For example, imprecise indicators such as demonstrative pronouns, adverbs of relative place etc. may be used in the command. Based on an analysis of one or more of the different modes of signals collected, including for example the directional information contained in at least some of the signals, one or more candidate objects of interest may be identified by command processor(s) 1125 in the depicted embodiment. One or more operations associated with one or more objects selected from the candidates may be performed. In some cases, information regarding the selected object or objects may be provided via output devices (ODs) 1122A or 1122B, such as speakers or displays. For example, an audio, visual or text response to the command or query may be provided via one or more of the output devices 1122. Various algorithms and techniques similar to those discussed above with respect to multimodal signal analysis (e.g., buffering techniques, techniques used when input signal data is partial or incomplete, techniques involving accessing remote data sources, ranking of candidate objects, various approaches towards disambiguation etc.) may be employed in stationary environments in the depicted embodiment.

Figure 12:
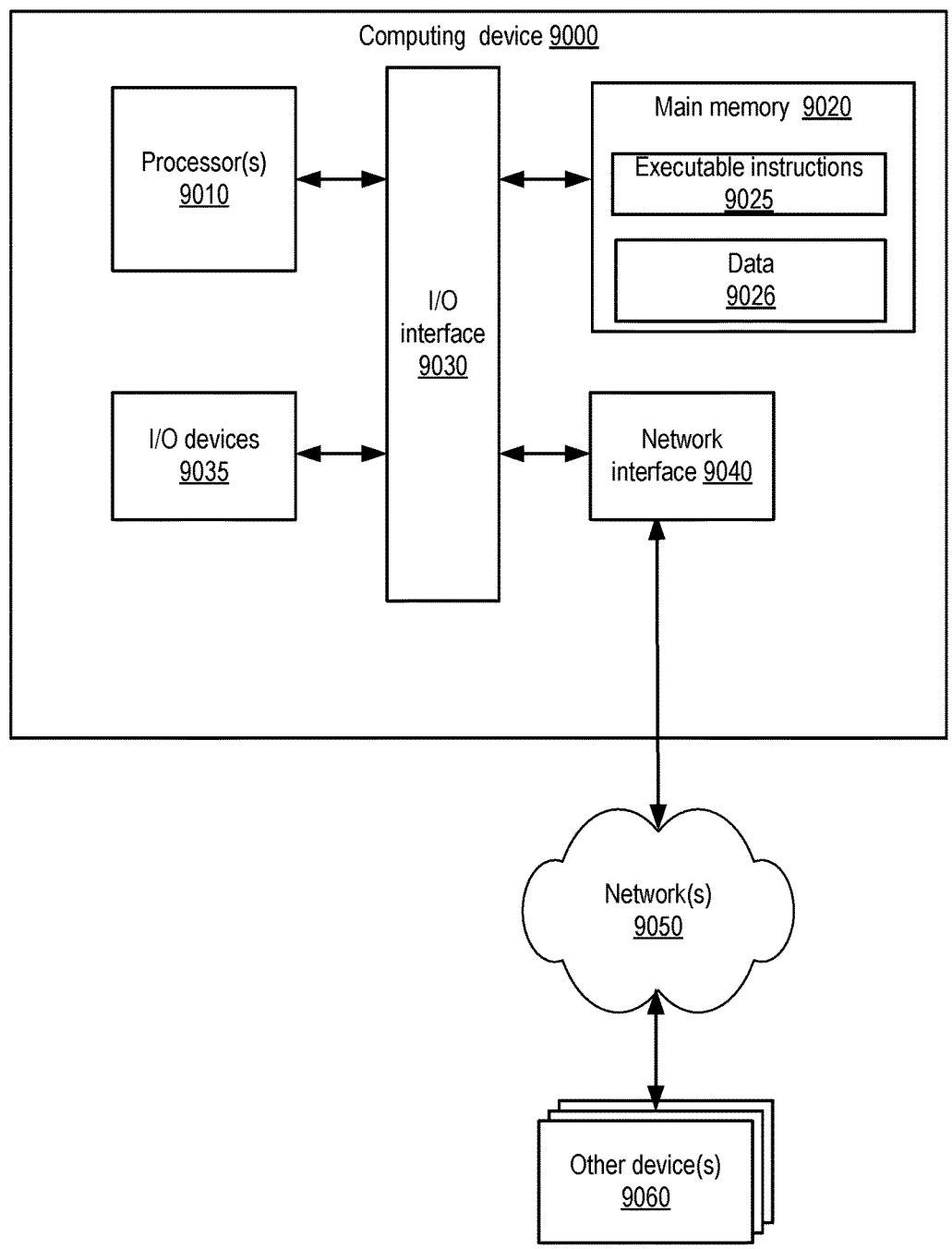
FIG. 12 is a block diagram illustrating an example computing device that may be used in at least some embodiments.

In at least some embodiments, a server that implements a portion or all of one or more of the technologies described herein, including the techniques to collect, obtain or process signals of various types (including gesture, gaze, or voice signals emanating from individuals as well as signals indicative of the individuals' external environment), may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a main memory 9020 (which may comprise both non-volatile and volatile memory modules, and may also be referred to as system memory) via an input/output (I/O) interface 9030. Computing device 9000 further includes a network interface 9040 coupled to I/O interface 9030, as well as additional I/O devices 9035 which may include sensors of various types.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

Memory 9020 may be configured to store instructions and data accessible by processor(s) 9010. In at least some embodiments, the memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, executable program instructions 9025 and data 1926 implementing one or more desired functions, such as those methods, techniques, and data described above, are shown stored within main memory 9020.

In one embodiment, I/O interface 9030 may be configured to coordinate I/O traffic between processor 9010, main memory 9020, and various peripheral devices, including network interface 9040 or other peripheral interfaces such as various types of persistent and/or volatile storage devices, sensor devices for gaze signal collection, gesture signal collection, external environmental signal collection, voice collection, etc. In some embodiments, I/O interface 9030 may perform any necessary protocol, timing or other data transformations to convert data signals from one component (e.g., main memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, main memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as main memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
performing, at one or more computing devices:
   obtaining, using one or more sensor devices of a plurality of sensor devices, a first data set indicative of a first signal modality and a first direction from an individual during at least a first time interval, wherein the first data set includes at least a first signal indicative of a gaze and a second signal indicative of a gesture;
   obtaining, using one or more of the sensor devices, a second data set indicative of a second signal modality from the individual during at least a second time interval which overlaps at least in part with the first time interval;
   in response to a command, wherein the command does not conclusively identify a particular object of interest to which the command is directed,
      identifying, based at least in part on an analysis of the first data set and the second data set, one or more candidate objects of interest to the individual, wherein the analysis includes determining that the gesture is directed within an angular range and that the gaze is directed in a gaze direction that is within the angular range of the gesture, and wherein the one or more candidate objects of interest are identified based at least in part on a combination of the gaze direction and the angular range of the gesture; and
      causing an operation associated with a first selected candidate object of interest of the one or more candidate objects of interest to be performed, wherein the first selected candidate object of interest is a virtual object defined in a virtual reality (VR) environment or an augmented reality (AR) environment.

2. The method as recited in claim 1, further comprising performing, by the one or more computing devices:
storing at least a subset of the first data set in a buffer, wherein the subset corresponds to a buffering interval associated with the first signal modality, and wherein the analysis comprises examining contents of the buffer.

3. The method as recited in claim 1, wherein at least one data set of the first data set or the second data set comprises a signal indicative of one or more of: a pointing gesture, a head orientation or movement, a torso orientation or movement, a gesture made using a body part other than a hand, a facial expression, one or more speech tokens, or an involuntary physiological response.

4. The method as recited in claim 1, further comprising performing, by the one or more computing devices:
determining the command based at least in part on an analysis of (a) one or more speech signals of the second data set, (b) one or more signals received via a touch screen interface, or (c) one or more signals expressed in sign language.

5. The method as recited in claim 1, wherein the operation associated with the first selected candidate object of interest comprises one or more of: (a) indicating a name of the first selected candidate object via a graphical display or an automated voice, (b) capturing a photograph or video of the first selected candidate object, (c) translating one or more words or symbols corresponding to the first selected candidate object, or (d) initiating a parking of a vehicle.

6. The method as recited in claim 1, further comprising performing, by the one or more computing devices:
   determining that the command comprises an imprecise indicator of an object of interest, wherein the imprecise indicator comprises one or more of: (a) a demonstrative pronoun or (b) an adverb of relative place.

7. The method as recited in claim 1, further comprising:
   in response to the command that does not conclusively identify a particular object of interest to which the command is directed, transmitting representations of the second data set to one or more remote computing resources for performing the analysis; and
   receiving, at the one or more computing devices, results of the analysis performed at the one or more remote computing resources,
   wherein the identifying includes identifying, based at least in part on the combination of the gaze direction and the angular range of the gesture, and based at least in part on the results of the analysis performed at the one or more remote computing resources, the one or more candidate objects of interest to the individual.

8. The method of claim 1, wherein the one or more sensor devices include one or more of: a portable device, a wearable device, an inertial sensor, an ultrasonic signal detector, a radar signal detector, a non-camera optical sensor, an EMG (electromyography) sensor, or a smart phone.

9. A system, comprising:
   a plurality of sensor devices; and
   one or more processors;
   wherein one or more of the sensor devices are configured to:
      collect a first data set indicative of a first signal modality and a first direction from an individual during at least a portion of a first time interval, wherein the first data set includes at least a first signal indicative of a gaze and a second signal indicative of a gesture;
   wherein one or more of the sensor devices are configured to:
      collect a second data set indicative of a second signal modality from the individual, during at least a second time interval which overlaps at least in part with the first time interval; and
   wherein the one or more processors are configured to:
      in response to a determination that a command has been issued, wherein the command does not definitively identify a particular object of interest to which the command is directed,
         identify, based at least in part on an analysis of the first data set and the second data set, one or more candidate objects of interest to the individual, wherein the analysis includes determining that the gesture is directed within an angular range and that the gaze is directed in a gaze direction that is within the angular range of the gesture, and wherein the one or more candidate objects of interest are identified based at least in part on a combination of the gaze direction and the angular range of the gesture; and
         cause an operation associated with a first selected candidate object of interest of the one or more candidate objects of interest to be performed, wherein the first selected candidate object of interest is a virtual object defined in a virtual reality (VR) environment or an augmented reality (AR) environment.

10. The system as recited in claim 9, wherein the analysis comprises:
    determining that direction-related information corresponding to the first signal modality is unavailable for at least a sub-interval of the first time interval.

11. The system as recited in claim 9, wherein the analysis comprises:
    analyzing at least a portion of the first data set in parallel with analyzing at least a portion of the second data set.

12. The system as recited in claim 9, wherein the one or more candidate objects of interest comprise a plurality of candidate objects of interest, and wherein the one or more processors are configured to:
    predict respective interest scores corresponding to individual ones of the plurality of candidate objects of interest; and
    select the first selected candidate object of interest from the plurality of candidate objects of interest, based at least in part on its predicted interest score.

13. The system as recited in claim 9, wherein to identify the one or more candidate objects of interest, the one or more processors are configured to:
    obtain still or video imagery pertaining to an environment of the individual; and
    cause an execution of an object recognition algorithm using at least a portion of the still or video imagery.

14. The system as recited in claim 9, wherein to identify the one or more candidate objects of interest, the one or more processors are configured to:
    query one or more of: (a) a map database indicating respective locations of a plurality of objects, wherein the plurality of objects include at least one object of the one or more candidate objects of interest, (b) a product catalog or (c) a data source accessible via the Internet.

15. One or more non-transitory computer-accessible storage media storing program instructions that when executed on or across one or more processors, cause the one or more processors to:
    obtain, using one or more sensor devices of a plurality of sensor devices, a first data set indicative of a first signal modality and a first direction from one or more individuals during at least a first time interval, wherein the first data set includes at least a first signal indicative of a gaze and a second signal indicative of a gesture;
    obtain, using one or more of the sensor devices, a second data set indicative of a second signal modality from at least one individual of the one or more individuals, during at least a second time interval which overlaps at least in part with the first time interval;
    identify, based at least in part on an analysis of the first data set and the second data set, one or more candidate objects of interest to a particular individual of the one or more individuals, wherein the analysis includes determining that the gesture is directed within an angular range and that the gaze is directed in a gaze direction that is within the angular range of the gesture, and wherein the one or more candidate objects of interest are identified based at least in part on a combination of the gaze direction and the angular range of the gesture; and
    cause an operation associated with a first selected candidate object of interest of the one or more candidate objects of interest to be performed, wherein the first selected candidate object of interest is a virtual object defined in a virtual reality (VR) environment or an augmented reality (AR) environment.

16. The one or more non-transitory computer-accessible storage media as recited in claim 15, wherein the one or more individuals include a second individual, and wherein the analysis of the first data set and the second data set comprises an examination of (a) data obtained from the particular individual and (b) data obtained from the second individual.

17. The one or more non-transitory computer-accessible storage media as recited in claim 15, wherein the analysis of the first data set and the second data set comprises an execution of a machine learning algorithm.

18. The one or more non-transitory computer-accessible storage media as recited in claim 15, wherein to identify the one or more candidate objects of interest to the particular individual, the instructions when executed on the one or more processors:
  cause a correlation-based analysis on a combination of respective portions of the first data set, the second data set, and a third data set to be performed, wherein the third data set is collected from one or more sensors of the particular individual's external environment.

19. The one or more non-transitory computer-accessible storage media as recited in claim 18, wherein the instructions when executed on the one or more processors, cause the one or more processors to:
  select, from among the one or more candidate objects of interest, the object of interest with which the operation is associated based at least in part on one or more of: (a) geographical context, (b) cultural context, (c) conversational context, or (d) personal profile information.

* * * * *